United States Patent
Chou et al.

(10) Patent No.: US 11,119,292 B2
(45) Date of Patent: Sep. 14, 2021

(54) IMAGING LENS ASSEMBLY WITH METAL RETAINER, CAMERA MODULE INCLUDING SAME ASSEMBLY AND ELECTRONIC DEVICE INCLUDING SAME MODULE

(71) Applicant: LARGAN PRECISION CO., LTD., Taichung (TW)

(72) Inventors: Ming-Ta Chou, Taichung (TW); Yu-Jen Chiu, Taichung (TW)

(73) Assignee: LARGAN PRECISION CO., LTD.

( * ) Notice: Subject to any disclaimer, the term of this patent is extended or adjusted under 35 U.S.C. 154(b) by 231 days.

(21) Appl. No.: 16/505,907

(22) Filed: Jul. 9, 2019

(65) Prior Publication Data

US 2020/0116973 A1    Apr. 16, 2020

(30) Foreign Application Priority Data

Oct. 11, 2018   (TW) .................................. 107135838

(51) Int. Cl.
   *G02B 7/02*   (2021.01)
(52) U.S. Cl.
   CPC .................................. *G02B 7/025* (2013.01)
(58) Field of Classification Search
   CPC .................................................... G02B 7/025
   USPC ........................................................ 359/808
   See application file for complete search history.

(56) References Cited

U.S. PATENT DOCUMENTS

| | | | |
|---|---|---|---|
| 6,867,848 B2 * | 3/2005 | Ebinuma | G03F 7/70825 355/53 |
| 6,870,693 B2 | 3/2005 | Ito | |
| 7,663,812 B2 | 2/2010 | Chang | |
| 7,746,576 B2 * | 6/2010 | Lee | G02B 7/022 359/811 |
| 8,014,655 B2 | 9/2011 | Chang et al. | |
| 8,018,668 B2 | 9/2011 | Lee et al. | |
| 8,070,304 B2 | 12/2011 | Matsuoka et al. | |
| 8,264,786 B2 | 9/2012 | Lee | |
| 8,270,106 B2 * | 9/2012 | Lee | G02B 7/021 359/829 |
| 9,140,826 B2 | 9/2015 | Miyazaki et al. | |
| 9,638,832 B1 | 5/2017 | Su | |
| 9,641,732 B2 | 5/2017 | Yasukochi et al. | |
| 9,678,336 B2 | 6/2017 | Cho et al. | |
| 2015/0212288 A1 * | 7/2015 | Inagaki | G02B 7/08 359/824 |
| 2015/0370034 A1 * | 12/2015 | Kasuga | G02B 7/022 359/819 |
| 2016/0370579 A1 * | 12/2016 | Cho | G02B 27/0018 |
| 2017/0176705 A1 * | 6/2017 | Wang | G02B 7/021 |
| 2018/0059354 A1 * | 3/2018 | Gutierrez | G02B 7/023 |

\* cited by examiner

*Primary Examiner* — Collin X Beatty
(74) *Attorney, Agent, or Firm* — McClure, Qualey & Rodack, LLP

(57) ABSTRACT

An imaging lens assembly includes a plastic barrel, a lens set and a metal retainer. The metal retainer is for fixedly disposing the lens set in the plastic barrel and includes an inner annular portion, a plurality of fixing portions and a plurality of elastic portions. The inner annular portion forms a through hole. The fixing portions directly contact the plastic barrel for the metal retainer to be fixedly disposed in the plastic barrel. At least one of the elastic portions connects the inner annular portion and at least one of the fixing portions.

20 Claims, 24 Drawing Sheets

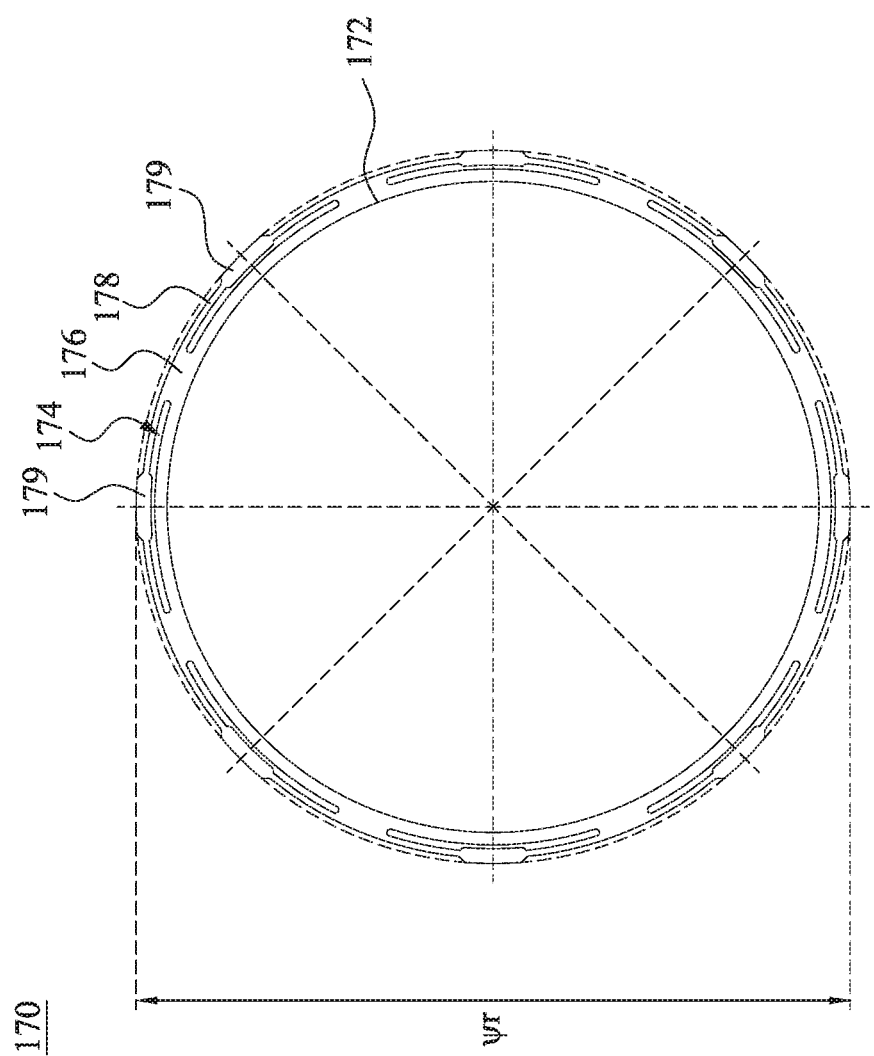

IMAGING LENS ASSEMBLY WITH METAL RETAINER, CAMERA MODULE INCLUDING SAME ASSEMBLY AND ELECTRONIC DEVICE INCLUDING SAME MODULE

RELATED APPLICATIONS

This application claims priority to Taiwan Application Serial Number 107135838, filed Oct. 11, 2018, which is herein incorporated by reference.

BACKGROUND

Technical Field

The present disclosure relates to an imaging lens assembly, a camera module and an electronic device. More particularly, the present disclosure relates to a compact imaging lens assembly and a compact camera module which include metal retainers and are applicable to electronic devices.

Description of Related Art

With the advanced semiconductor manufacturing technologies, the performances of image sensors are enhanced, and the pixel size is minified. Therefore, camera modules and imaging lens assemblies thereof with high image quality become indispensable. Moreover, with the rapid scientific and technological progress, the application scope of electronic devices equipped with camera modules becomes wider, and the requirements for camera modules and imaging lens assemblies thereof are more diverse.

In a conventional technique of disposing a lens set in a lens barrel, a plastic retainer is abutted with an image-side lens element, which is closest to an image side among lens elements of the lens set, and then an adhesive material is applied on the plastic retainer and the lens barrel. However, the thickness of the plastic retainer is general above 0.2 mm. Thus, the thickness of the plastic retainer becomes an obstruction of the compact size design of a camera module and an imaging lens assembly thereof while an increasing compact specification of the camera module being required by electronic devices. Furthermore, due to the application of the adhesive material is not easily controlled, it results that the adhesive material overflows from an outer diameter surface of the plastic retainer to an outer diameter surface or even an optical effective area of the lens element, which is abutted with the plastic retainer. Thus, the assembling yield rate and the image quality of the imaging lens assembly will be reduced.

In another conventional technique of disposing a lens set in a lens barrel, a retainer is omitted, and an adhesive material is directly applied on the lens barrel and a an image-side lens element, which is closest to an image side among lens elements of the lens set. As a result, the problems of unevenly applying and overflow of the adhesive material directly affect the lens element itself, which are highly related to the image quality. On the other hand, if a non-optical-effective area, which surrounds an optical effective area, is enlarged to suppress the overflow, it will be paid that the volumes of the camera module and the imaging lens assembly thereof are increased, and the requirements of the optical specification are dissatisfied.

Given the above, it is hard for balancing the requirements, such as optical specifications, the image quality and the volume in conventional camera modules and imaging lens assemblies thereof. Therefore, a camera module and an imaging lens assembly thereof are provided by the present disclosure to satisfy the desired requirement.

SUMMARY

According to one aspect of the present disclosure, an imaging lens assembly includes a plastic barrel, a lens set and a metal retainer. The metal retainer is for fixedly disposing the lens set in the plastic barrel and includes an inner annular portion, a plurality of fixing portions and a plurality of elastic portions. The inner annular portion forms a through hole. The fixing portions directly contact the plastic barrel for the metal retainer to be fixedly disposed in the plastic barrel. At least one of the elastic portions connects the inner annular portion and at least one of the fixing portions. When a thickness of the metal retainer is d, the following condition is satisfied: 0.01 mm<d<0.20 mm.

According to another aspect of the present disclosure, a camera module includes the imaging lens assembly according to the foregoing aspect.

According to another aspect of the present disclosure, an electronic device includes the camera module according to the foregoing aspect and an image sensor. The image sensor is disposed on an image surface of the camera module.

BRIEF DESCRIPTION OF THE DRAWINGS

The present disclosure can be more fully understood by reading the following detailed description of the embodiment, with reference made to the accompanying drawings as follows:

FIG. 1F is a schematic view of a maximum outer diameter of the metal retainer according to the 1st embodiment.

DETAILED DESCRIPTION

<1st Embodiment>

Figure 1A:
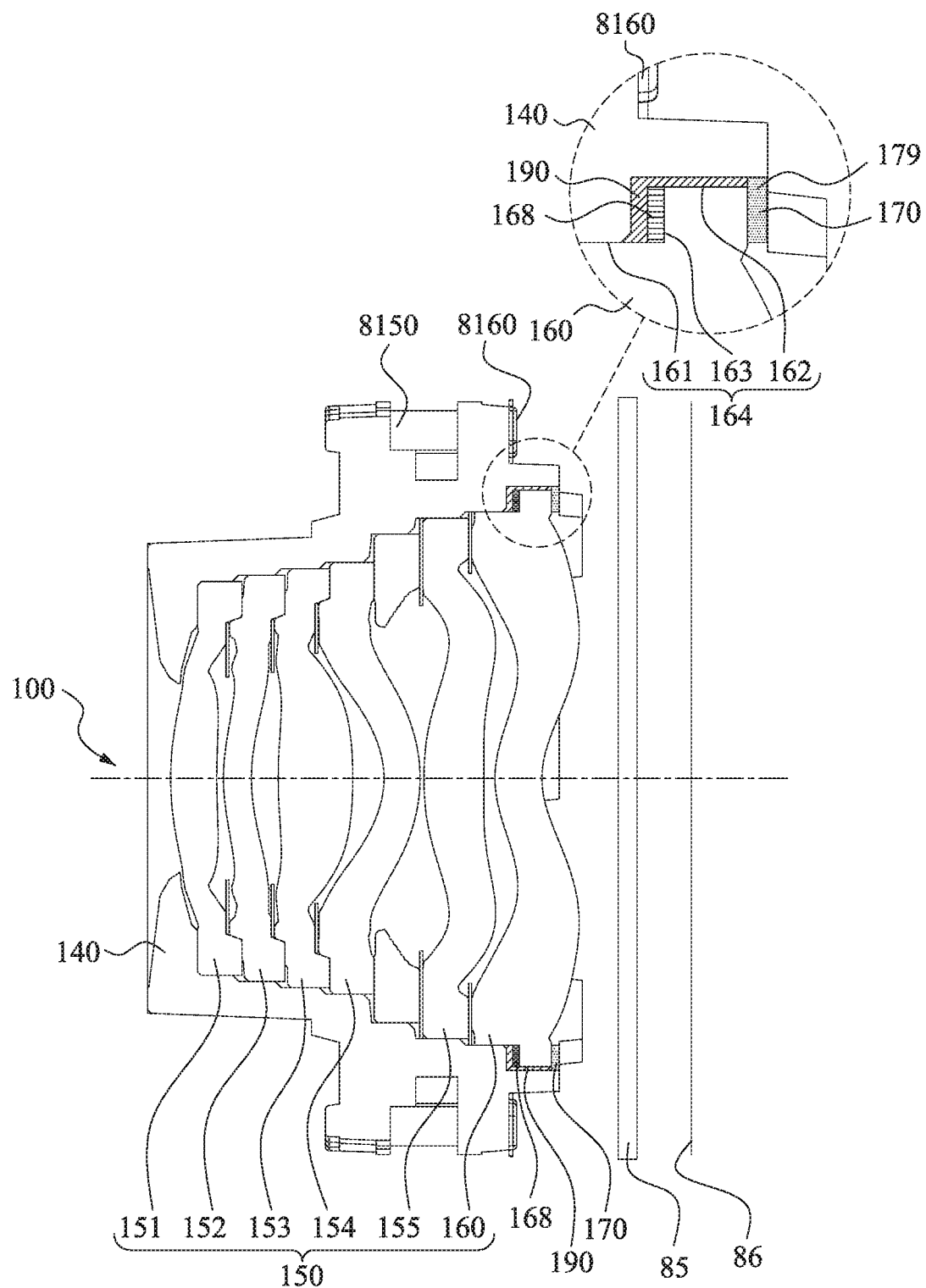
FIG. 1A is a schematic view of an imaging lens assembly according to the 1st embodiment of the present disclosure assembled with a lower leaf spring and a wire element.
Figure 1B:
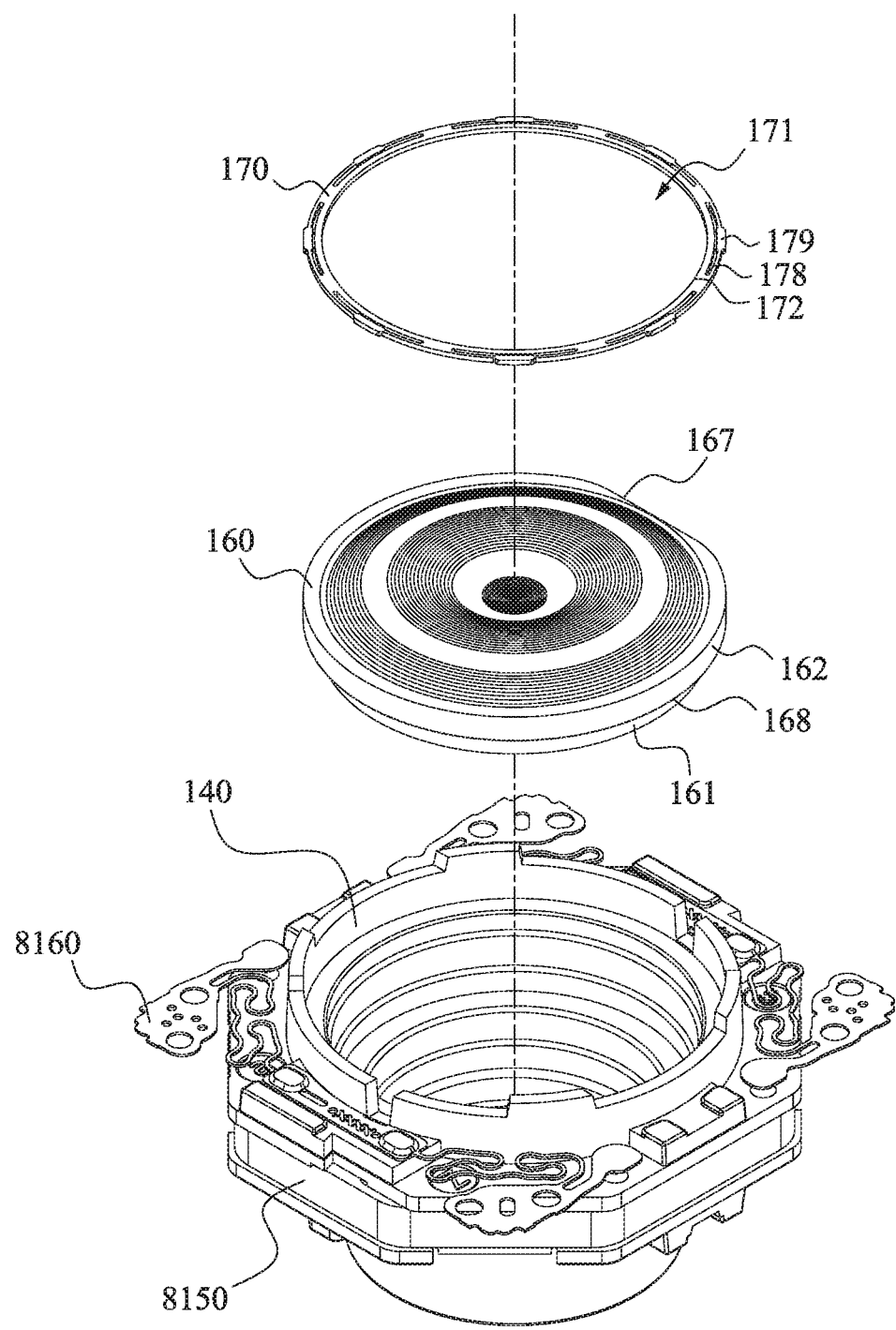
FIG. 1B is an exploded view of parts of the imaging lens assembly according to the 1st embodiment.
Figure 1C:
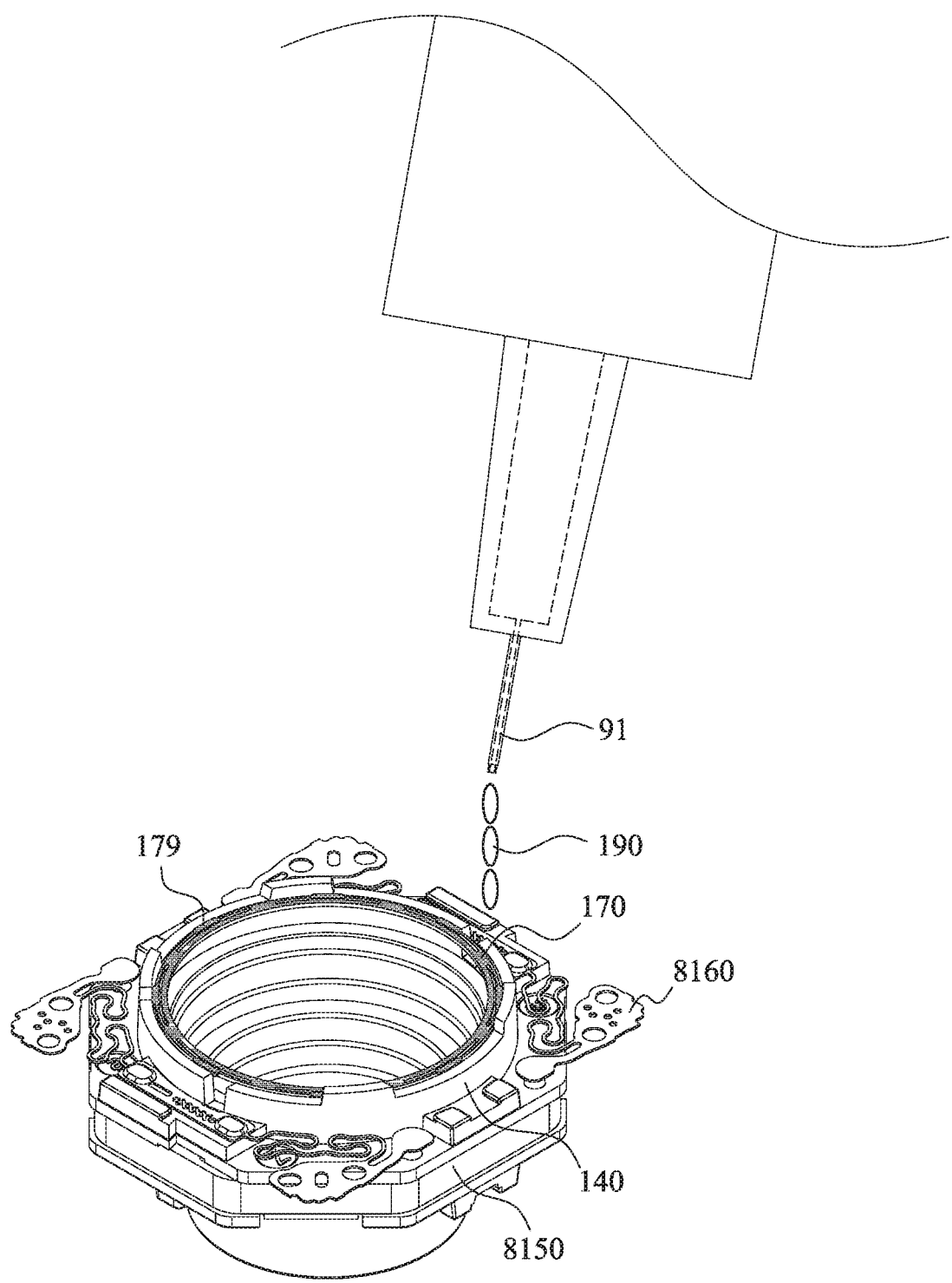
FIG. 1C is a schematic view of applying an adhesive layer according to the 1st embodiment.

FIG. 1A is a schematic view of an imaging lens assembly 100 according to the 1st embodiment of the present disclosure assembled with a lower leaf spring 8160 and a wire element 8150. FIG. 1B is an exploded view of a metal retainer 170, an images-side lens element 160 and a plastic barrel 140 of the imaging lens assembly 100 according to the 1st embodiment. FIG. 1C is a schematic view of applying an adhesive layer 190 according to the 1st embodiment. In FIG. 1A to FIG. 1C, the imaging lens assembly 100 includes the plastic barrel 140, a lens set 150 and the metal retainer 170. The metal retainer 170 is for fixedly disposing the lens set 150 in the plastic barrel 140. The lens set 150 has an optical axis (its reference numeral is omitted) and includes a plurality of lens elements. The optical axis of the lens set 150 is also an optical axis of the imaging lens assembly 100. An image-side lens element 160 is one of the lens elements closest to an image side of the lens set 150 (i.e. a right side in FIG. 1A). The metal retainer 170 is disposed in an image-side direction of the image-side lens element 160. In addition, the plastic barrel 140 of the imaging lens assembly 100 and an autofocus assembly (including a conventional wire element 8150, a conventional lower leaf spring 8160 and etc. to achieve an autofocus function) may be assembled to be a camera module, which will not be further recited and illustrated in detail in the 1st embodiment.

Figure 1D:
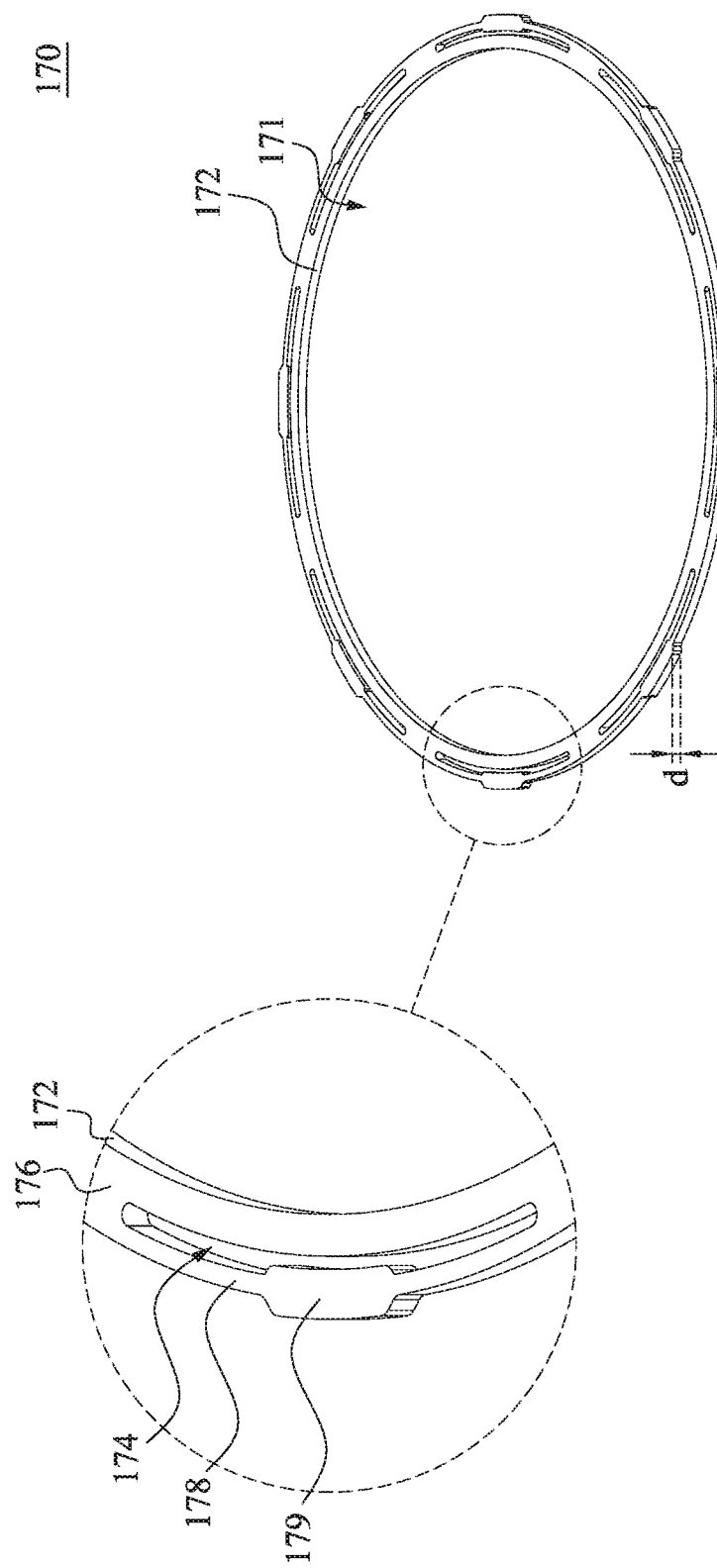
FIG. 1D is a three-dimensional view of a metal retainer according to the 1st embodiment.
Figure 1E:
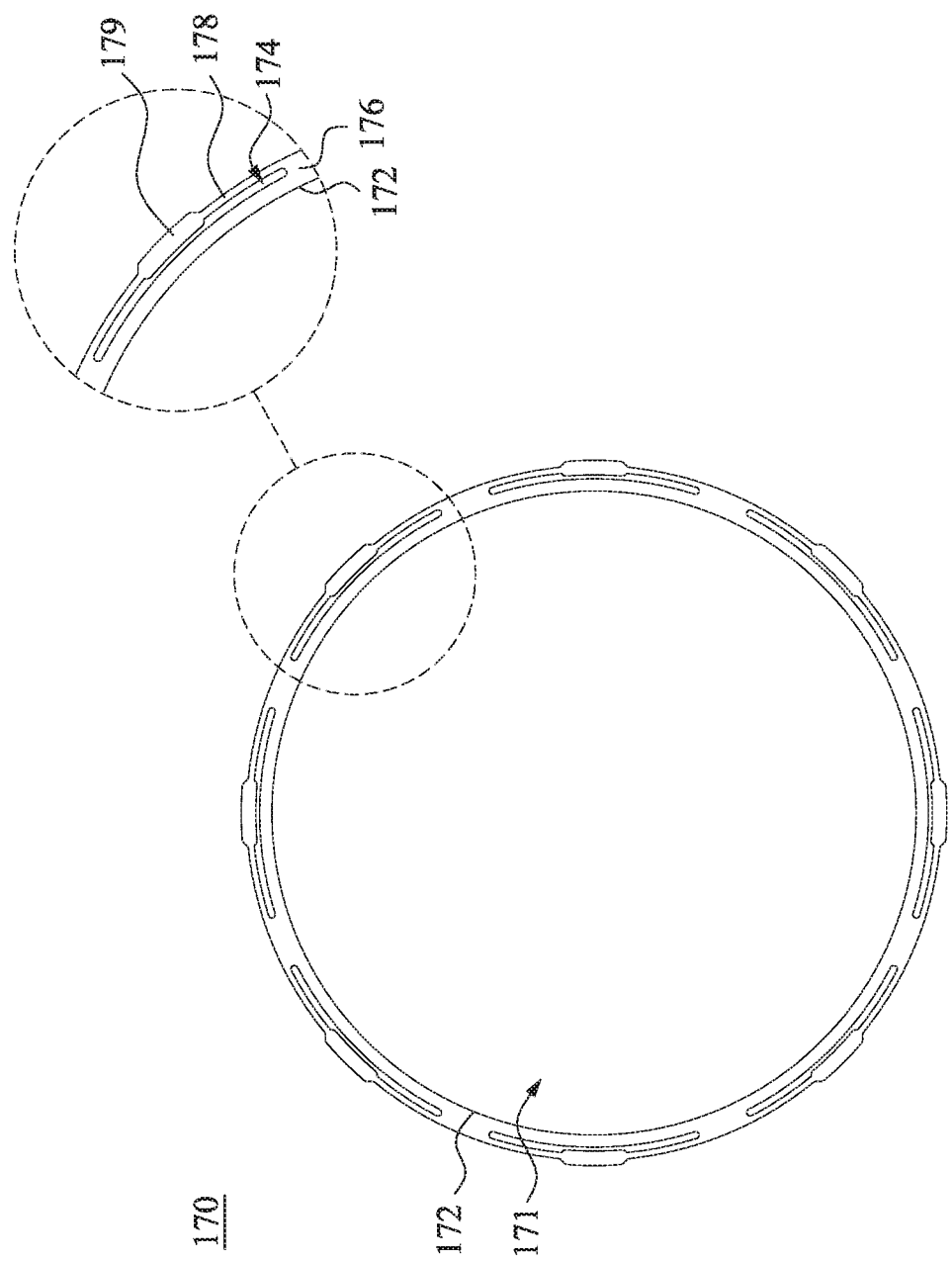
FIG. 1E is a side view of the metal retainer according to the 1st embodiment.

FIG. 1D is a three-dimensional view of the metal retainer 170 according to the 1st embodiment. FIG. 1E is a side view, observed from an object side or the image side (i.e. from a position on the optical axis), of the metal retainer 170 according to the 1st embodiment. In FIG. 1A to FIG. 1E, the metal retainer 170 is in a circularly annular shape and includes an inner annular portion 172, a plurality of fixing portions 179 and a plurality of elastic portions 178. The inner annular portion 172 forms a through hole 171 of the metal retainer 170. The optical axis passes through the through hole 171. The fixing portions 179 directly contact the plastic barrel 140 for the metal retainer 170 to be fixedly disposed in the plastic barrel 140. At least one of the elastic portions 178 connects the inner annular portion 172 and at least one of the fixing portions 179. Furthermore, the metal retainer 170 may be made of a metal material overall, or made of a metal material with just a part thereof, such as being processed with a metal coating or a metal painting on a surface of a nonmetal material.

In FIG. 1D, when a thickness of the metal retainer 170 is d, the following condition is satisfied: 0.01 mm<d<0.20 mm. Therefore, the metal material and the structure of the metal retainer 170 are advantageous in fixedly disposing the lens set 150 in the plastic barrel 140. The metal retainer 170 being a spring sheet type and having a smaller thickness is favorable for reducing the volume of the imaging lens assembly 100, so as to satisfy increasing compact requirements of the camera module and the imaging lens assembly thereof, and maintain the optical specification and image quality. Furthermore, the following condition may be satisfied: 0.01 mm<d<0.13 mm. Therefore, the metal retainer 170 being the spring sheet type and satisfying the aforementioned condition has the proper thickness d, so that the warpage and the deformation, which are resulted from an overly small thickness and unfavorable for assembling, can be avoided, and the mechanical interference inside the camera module, which is resulted from an overly large thickness and affects the operation of the camera module, can also be avoided.

Moreover, in FIG. 1D and FIG. 1E, the elastic portions 178 of the metal retainer 170 may surround the inner annular portion 172. Therefore, it is favorable for fabricating the metal retainer 170 with a smallest volume and the elastic portions 178 being compressed in radiation directions, so that the alignment tolerance between the through hole 171 and the optical axis of the lens set 150 can be reduced.

The optical axis passes through the through hole 171 of the metal retainer 170. An appearance of each of the elastic portions 178 may be in an arc shape, and the elastic portions 178 are not overlapped along a radiation direction of the optical axis (i.e. a radial direction of the optical axis). Therefore, it is favorable for preventing the elastic portions 178 from having an overly soft elastic force or structure, so that the concerns related to the lens set 150 loosened from the plastic barrel 140, which is caused by an insufficient fixing force, can be reduced. In the 1st embodiment, the appearance of each of the elastic portions 178 is in a strip arc shape with a constant width. One of the elastic portions 178 is not overlapped by itself along the radiation direction of the optical axis, and two of the elastic portions 178 are not overlapped by each other along the radiation direction of the optical axis.

In the 1st embodiment, a number of the fixing portions 179 of the metal retainer 170 is eight. An appearance of each of the fixing portions 179 is in the same arc shape. The eight fixing portions 179 are regularly arranged with the same spaces along a circumferential direction of the optical axis. That is, the eight fixing portions 179 discretely surround the inner annular portion 172 and the through hole 171. Two ends of each of the fixing portions 179 are respectively connected to two of the elastic portions 178. A number of the elastic portions 178 of the metal retainer 170 is sixteen. The appearance of each of the elastic portions 178 is in the same arc shape. The sixteen elastic portions 178 are arranged along the circumferential direction of the optical axis. That is, the sixteen elastic portions 178 discretely surround the inner annular portion 172 and the through hole 171. One end of each of the elastic portions 178 is directly connected to one of the fixing portions 179, and the other end of each of the elastic portions 178 is directly connected to one of a plurality of frame portions 176. The one of the frame portions 176 is directly connected to the inner annular portion 172, that is, the other end of each of the elastic portions 178 is indirectly connected to the inner annular portion 172. Furthermore, a length along the radiation direction of the optical axis of each of the frame portions 176 is greater than a length along the radiation direction of each of the fixing portions 179, and the length along the radiation direction of each of the fixing portions 179 is greater than a length along the radiation direction of each of the elastic portions 178. In other embodiments according to the present disclosure (not shown in drawings), each of fixing portions may be not in an arc shape. Each of elastic portions connects an inner annular portion and one of the fixing portions, and may be not in an arc shape.

In FIG. 1A to FIG. 1C, a position, which is assembled with the metal retainer 170, on an inner annular surface (its reference numeral is omitted) of the plastic barrel 140 is in a circular shape. The fixing portions 179 are the portions protruding most on the metal retainer 170, so that an outer annular surface (its reference numeral is omitted) of each of the fixing portions 179 directly contacts the inner annular surface of the plastic barrel 140 for the metal retainer 170 to be fixedly disposed in the plastic barrel 140, as shown in FIG. 1A. In addition, FIG. 1A is a sectional view for clearly showing the characteristics on cross-sectional planes of the plastic barrel 140, the lens set 150 and the metal retainer 170 of the imaging lens assembly 100. In FIG. 1A, the metal retainer 170 is shown as a dot area, a plurality of strip-shaped wedge structures 168 and the adhesive layer 190 are respectively shown as different line areas, and the dots and the lines in FIG. 1A are not specific structures thereon.

FIG. 1F is a schematic view of a maximum outer diameter ψr of the metal retainer 170 according to the 1st embodiment. In FIG. 1F, the outer annular surface of each of the fixing portions 179 is farther from the optical axis than both the elastic portions 178 and the frame portions 176 from the optical axis. A distance passing through the optical axis between two outer annular surfaces respectively of opposite two of the fixing portions 179 is the maximum outer diameter ψr of the metal retainer 170. When a length ratio between the fixing portions 179 and a circular circumference corresponding to the maximum outer diameter ψr of the metal retainer 170 minus the fixing portions 179 is f %, the following condition may be satisfied: 5%<f %<40%. The circular circumference corresponding to the maximum outer diameter ψr can be a virtual circular circumference defined by the maximum outer diameter ψr acting as a diameter thereof. Therefore, the length ratio f % below 50% or further 40% is favorable for designing two of the elastic portions 178 respectively on the two ends of each of the fixing portions 179 to increase the elastic force so as to raise the fixing force of the metal retainer 170 with a small volume. Furthermore, the following condition may be satisfied: 10%<f %<32%. Therefore, the length ratio f % being further smaller and more appropriate is favorable for increasing a length of each of the elastic portions 178 while the number of the fixing portions 179 being unchanged so as to adjust the fixing force based on the size of the imaging lens assembly 100.

In FIG. 1F of the 1st embodiment, the maximum outer diameter ψr of the metal retainer 170 is 4.6 mm. As dashed lines shown in FIG. 1F, the circular circumference corresponding to the maximum outer diameter ψr (i.e. the virtual circular circumference defined by the maximum outer diameter ψr as the diameter thereof) is equally divided into eight parts. An arc length of the fixing portion 179 of each of the eight parts is 0.3468 mm. Accordingly, the length ratio between the eight fixing portions 179 and the circular circumference corresponding to the maximum outer diameter ψr of the metal retainer 170 minus the eight fixing portions 179 is 23.76%.

In FIG. 1D and FIG. 1E, a plurality of gaps 174 may be disposed between the inner annular portion 172 and the fixing portions 179. Therefore, the gaps 174 are favorable for the metal retainer 170 to have moving spaces for being elastically compressed. The compressed directions are respectively along the radiation directions of the optical axis, that is, being compressed inward as the radiation pattern, or being extended outward as the radiation pattern. In the 1st embodiment, a number of the gaps 174 is eight. Each gap 174 is located correspondingly to one of the fixing portions 179 and two of the elastic portions 178, which are connected to two ends of the one of the fixing portions 179. Each gap 174 is located between the inner annular portion 172 and the corresponding fixing portion 179, and also located between the inner annular portion 172 and the two corresponding elastic portions 178.

The number of the fixing portions 179 may be smaller than or equal to the number of the elastic portions 178. Therefore, the metal retainer 170 being the thin spring sheet type is advantageous in providing a greater elastic force, so that the metal retainer 170 would more fixedly dispose the lens set 150.

When the number of the fixing portions 179 is Nf, the following condition may be satisfied: 6<Nf<16. Therefore, it is favorable for the fixing portions 179 to be forced evenly so as to prevent from increasing manufacturing tolerances and affecting the coaxiality between the through hole 171 and the optical axis, which are caused by an overly large contact area between a single fixing portion and a plastic barrel. In the 1st embodiment, the number Nf of the fixing portions 179 of the metal retainer 170 is eight, the number Ne of the elastic portions 178 of the metal retainer 170 is sixteen, and the condition Nf<Ne is satisfied.

In FIG. 1A and FIG. 1C, the imaging lens assembly 100 may further include the adhesive layer 190, which is applied on the metal retainer 170 and the plastic barrel 140. Therefore, the imaging lens assembly 100 is advantageous in resisting external impacts and avoiding a position shift of the metal retainer 170 caused by stretching, shrinking, or expanding of the metal retainer 170 while the temperature changing greatly.

The adhesive layer 190 may be an opaque adhesive layer. Therefore, it is favorable for reducing the stray light reflection so as to enhance the image quality of the imaging lens assembly 100.

An appearance of the metal retainer 170 may be black. Therefore, the non-imaging light would not be reflected more from area without being applied by the adhesive layer 190 so as to reduce the glare defects. Specifically, the metal retainer 170 may be made of a black dyed metal material or a non-black metal material coated with a black paint.

In FIG. 1A, the lens set 150 of the imaging lens assembly 100 includes lens elements 151, 152, 153, 154, 155 and the images-side lens element 160 in order from the object side (i.e. a left side in FIG. 1A) to the image side. The lens set 150 has a total of six lens elements (151, 152, 153, 154, 155 and 160), and the lens elements 151, 152, 153, 154, 155 and the images-side lens element 160 are disposed along the optical axis in the plastic barrel 140. Other optical element, e.g. an imaging compensation element, a light blocking sheet, a spacer and etc., may be disposed among the lens elements of the lens set 150, and the image-side lens element 160 is the lens element closest to the image side of the lens set 150 among the lens elements of the lens set 150. Furthermore, the plastic barrel 140 of the imaging lens assembly 100 and the autofocus assembly (including the wire element 8150, the lower leaf spring 8160 and etc.) are assembled to be the camera module. A glass panel 85 and an imaging surface 86 may be disposed in an image side of the camera module (i.e. the image side of the imaging lens assembly 100 and the image side of the lens set 150). The glass panel 85 can be a cover glass, a filter or both above, and will not affect the focal length of the lens set 150. The position of the imaging surface 86 is for an imaging sensor to be disposed.

In FIG. 1A and FIG. 1C, the adhesive layer 190 may be filled in at least one of the gaps 174, and the image-side lens element 160, the metal retainer 170 and the plastic barrel 140 are fixedly adhered by the adhesive layer 190. That is, the adhesive layer 190 is filled in spaces among the image-side lens element 160, the metal retainer 170 and the plastic barrel 140, so that the image-side lens element 160, the metal retainer 170 and the plastic barrel 140 are fixedly adhered and fixedly disposed in relative positions. Therefore, the gaps 174 can also act as receiving grooves for accommodating the adhesive layer 190 to absorb excessive parts of the adhesive layer 190 so as not to contaminate the image-side lens element 160 or other lens elements of the imaging lens assembly 100.

Specifically, in an assembling procedure of the imaging lens assembly 100 shown as FIG. 1A and FIG. 1C, first the plastic barrel 140 can be assembled with some components of the camera module, e.g. the wire element 8150 and the lower leaf spring 8160, and next the lens elements 151, 152, 153, 154, 155, the images-side lens element 160 and the metal retainer 170 are assembled in the plastic barrel 140 in order. A needle 91 is placed above the metal retainer 170 (the lens elements assembled in the plastic barrel 140 being omitted in FIG. 1C to clearly show the metal retainer 170), and the needle 91 and the plastic barrel 140 together with the metal retainer 170 have degrees of freedom to move or rotate relatively by fixtures (not shown in drawings) for the adhesive layer 190 to be intermittently applied on the metal retainer 170. For example, the adhesive layer 190 can be intermittently applied on eight or other number positions of the metal retainer 170. The metal retainer 170 and a non-optical-effective area, which surrounds an optical effective area of an image-side surface and is without reference numeral, of the image-side surface of the images-side lens element 160 are adhered mainly by the adhesive layer 190 filled in the gaps 174. The adhesive layer 190 before solidification flows along spaces among the elastic portions 178, the frame portions 176 and the plastic barrel 140 into spaces between the images-side lens element 160 and the plastic barrel 140, so that the image-side lens element 160, the metal retainer 170 and the plastic barrel 140 can be fixedly adhered by the adhesive layer 190.

Figure 1G:
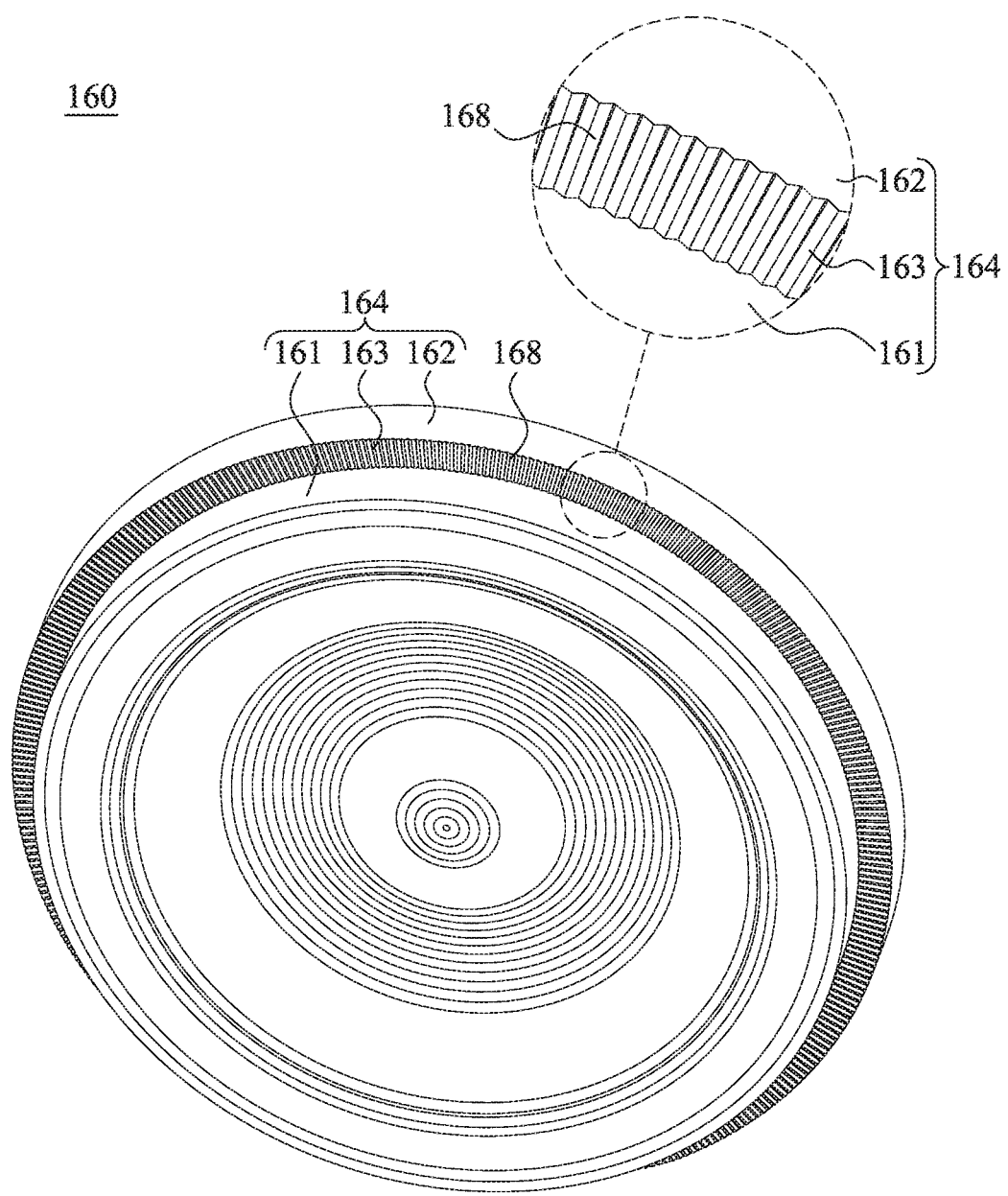
FIG. 1G is a three-dimensional view of an image-side lens element according to the 1st embodiment.
Figure 1H:
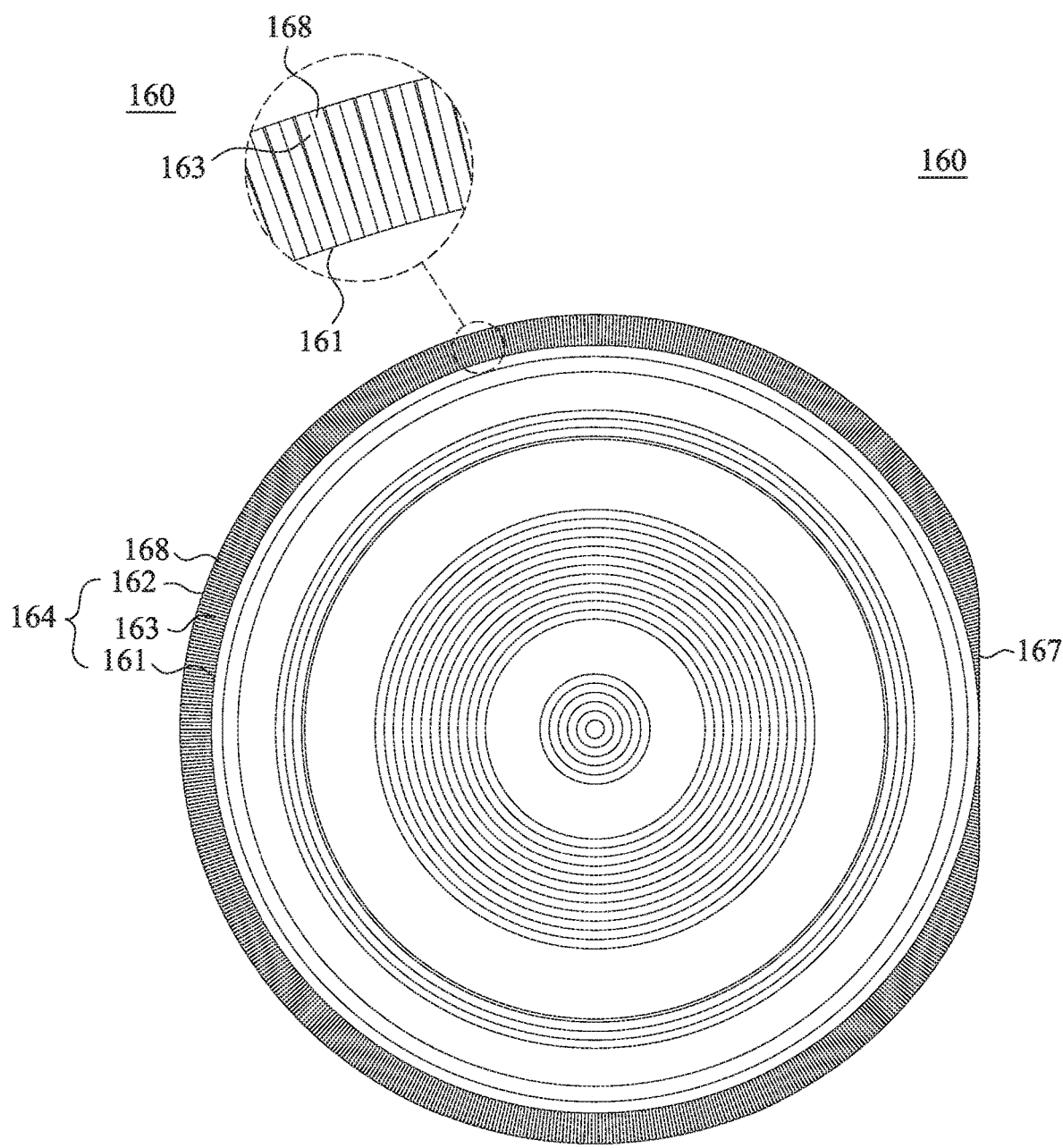
FIG. 1H is a side view of the image-side lens element according to the 1st embodiment.
Figure 1I:
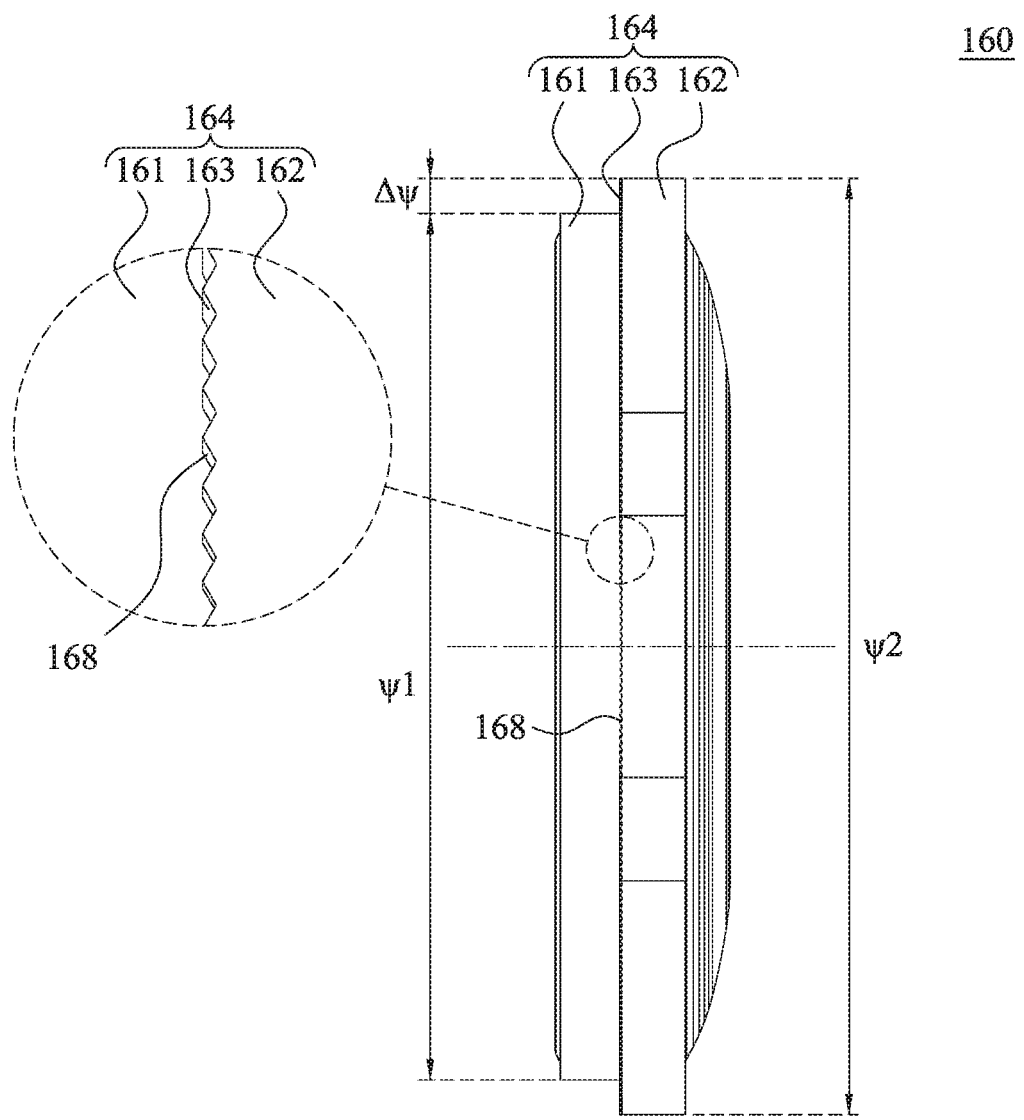
FIG. 1I is another side view of the image-side lens element according to the 1st embodiment.

FIG. 1G is a three-dimensional view of the image-side lens element 160 according to the 1st embodiment. FIG. 1H is a side view, observed from the object side, of the image-side lens element 160 according to the 1st embodiment. FIG. 1I is another side view, observed from a direction vertical to the optical axis, of the image-side lens element 160 according to the 1st embodiment. In FIG. 1A, FIG. 1G to FIG. 1I, an outer diameter surface 164 may include a first outer diameter surface 161 and a second outer diameter surface 162 in order from the object side to the image side of the lens set 150. Only the first outer diameter surface 161 of the first outer diameter surface 161 and the second outer diameter surface 162 contacts the plastic barrel 140, and a step difference is formed by the first outer diameter surface 161 and the second outer diameter surface 162. Therefore, it is favorable for improving the problems of the adhesive layer 190 excessively overflowing to the image-side lens element 160, so that the adhesive layer 190 is mainly remained on the second outer diameter surface 162 of the image-side lens element 160 to prevent from overflowing to the spaces between the first outer diameter surface 161 and the plastic barrel 140.

In FIG. 1I, when a maximum outer diameter of the first outer diameter surface 161 is $\psi1$, a maximum outer diameter of the second outer diameter surface 162 is $\psi2$, and the step difference formed by the first outer diameter surface 161 and the second outer diameter surface 162 is $\Delta\psi$, which is calculated from $(\psi2-\psi1)/2$, the following condition may be satisfied: $0.05 \text{ mm} < \Delta\psi < 0.35 \text{ mm}$. Therefore, the image-side lens element 160 satisfying the aforementioned range of the parameter $\Delta\psi$ has a specific dimension, so that it is favorable for preventing from an unapparent effect of suppressing the overflow, which is caused by an overly small value of the parameter $\Delta\psi$, and also preventing from affecting an optical imaging uniformity of the image-side lens element 160, which is caused by an overly large value of the parameter $\Delta\psi$. In the 1st embodiment, the maximum outer diameter $\psi1$ of the first outer diameter surface 161 is smaller than the maximum outer diameter $\psi2$ of the second outer diameter surface 162. An inner diameter on the inner annular surface of the plastic barrel 140, which is located corresponding to assembling with the first outer diameter surface 161, is smaller than an inner diameter on the inner annular surface of the plastic barrel 140, which is located corresponding to assembling with the second outer diameter surface 162. Only the first outer diameter surface 161 of the first outer diameter surface 161 and the second outer diameter surface 162 contacts the plastic barrel 140.

In FIG. 1G to FIG. 1I, the image-side lens element 160 may include the plurality of strip-shaped wedge structures 168, and at least one of the strip-shaped wedge structures 168 directly contacts the adhesive layer 190. Therefore, the strip-shaped wedge structures 168 are advantageous in enlarging the contact areas between a non-optical-effective area of the image-side lens element 160 and the adhesive layer 190 so as to increase the fixing stability of the image-side lens element 160. In the 1st embodiment, a transverse cross-sectional plane of each of the strip-shaped wedge structures 168 is in an upper narrow and lower wide shape (i.e. tapered form the lower end to the upper end), as shown in FIG. 1G and FIG. 1I. Adjacent two of the strip-shaped wedge structures 168 form a strip V-shaped groove, and an entirety of the strip-shaped wedge structures 168 form V-shaped grooves arranged in a radiation pattern.

The strip-shaped wedge structures 168 may be disposed between the first outer diameter surface 161 and the second outer diameter surface 162. Therefore, it is favorable for suppressing the overflow of the adhesive layer 190 to the first outer diameter surface 161 so as to provide a further better suppression for the overflow.

Specifically, the outer diameter surface 164 of the image-side lens element 160 includes the first outer diameter surface 161, a step difference surface 163 and the second outer diameter surface 162 in order from the object side to the image side of the lens set 150. The second outer diameter surface 162 includes a recessed portion 167 caused by a cutting trace of an injection gate. A normal direction of the first outer diameter surface 161 and a normal direction of the second outer diameter surface 162 are both vertical to the optical axis, and a normal direction of the step difference surface 163 is parallel to the optical axis. The strip-shaped wedge structures 168 are disposed on the step difference surface 163 and regularly arranged with the same spaces along the circumferential direction of the optical axis. Each of the strip-shaped wedge structures 168 has the same structure and is disposed in the radiation direction of the optical axis. As shown in FIG. 1A, the adhesive layer 190 flows from spaces between the second outer diameter surface 162 (including the recessed portion 167) and the inner annular surface of the plastic barrel 140 to the at least one of the strip-shaped wedge structures 168. It is beneficial to prevent the adhesive layer 190 from continuously overflowing to the first outer diameter surface 161, so that the image-side lens element 160, the metal retainer 170 and the plastic barrel 140 are fixedly adhered by the adhesive layer 190. In other embodiments according to the present disclosure (not shown in drawings), a plurality of strip-shaped wedge structures may be disposed on an outer diameter surface of an image-side lens element, a non-optical-effective area of an object-side surface thereof or a non-optical-effective area of an image-side surface thereof, and the strip-shaped wedge structures may be not regularly disposed.

When a number of the strip-shaped wedge structures 168 is n, the following condition may be satisfied: 100<n<600. Therefore, it is favorable for much enlarging the surface areas of the strip-shaped wedge structures 168 to increase the contact areas between the adhesive layer 190 and the strip-shaped wedge structures 168 so as to provide a further better suppression of the overflow.

The data of the aforementioned parameters of the imaging lens assembly 100 according to the 1st embodiment of the present disclosure are listed in the following Table 1, wherein the parameters are also shown as FIG. 1D, FIG. 1F and FIG. 1I.

TABLE 1

1st Embodiment

| | | | |
|---|---|---|---|
| d (mm) | 0.06 | ψ1 (mm) | 4.2 |
| ψr (mm) | 4.6 | ψ2 (mm) | 4.54 |
| f % | 23.76% | Δψ (mm) | 0.17 |
| Nf | 8 | n | 360 |
| Ne | 16 | | |

2nd Embodiment

Figure 2A:
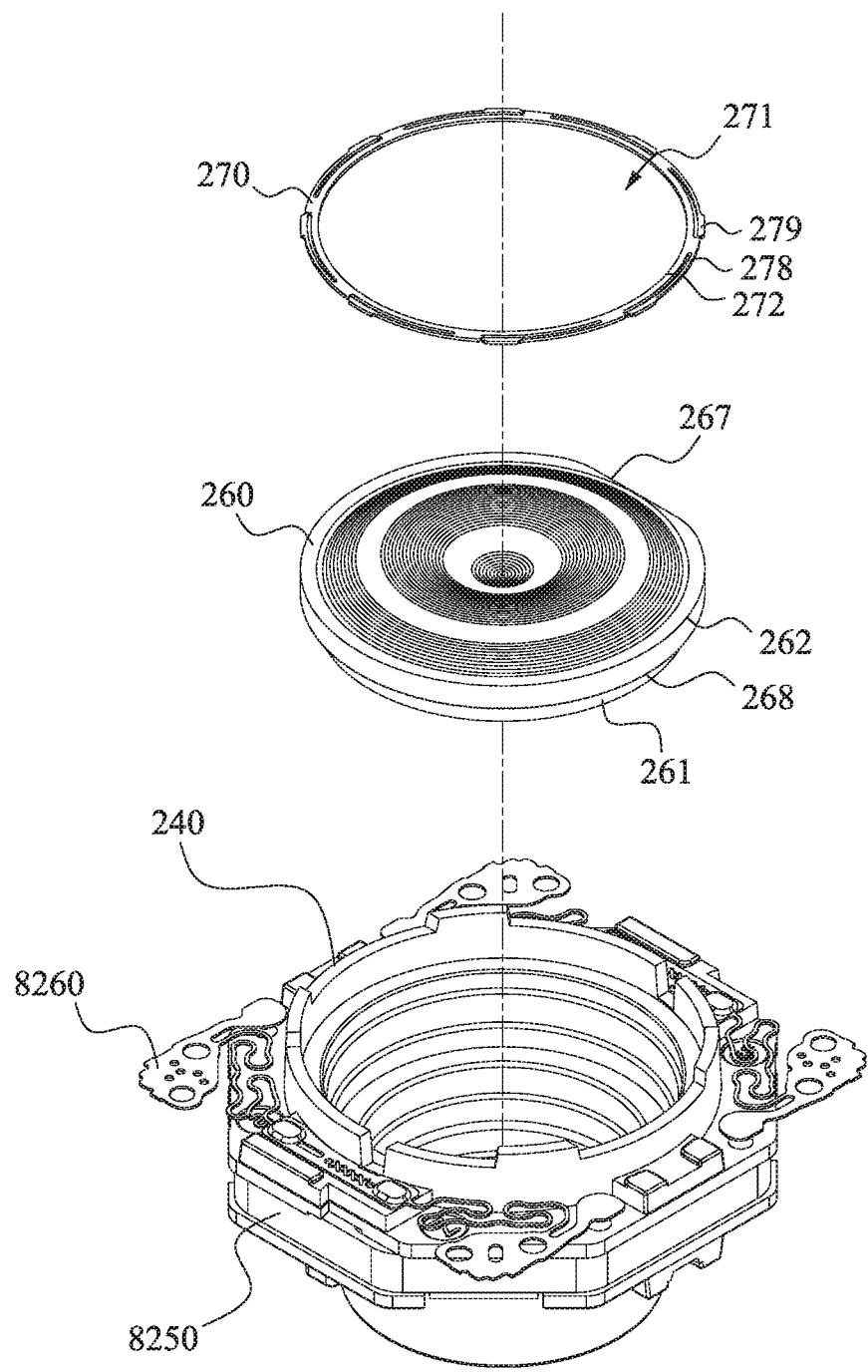
FIG. 2A is an exploded view of parts of an imaging lens assembly according to the 2nd embodiment of the present disclosure.
Figure 2B:
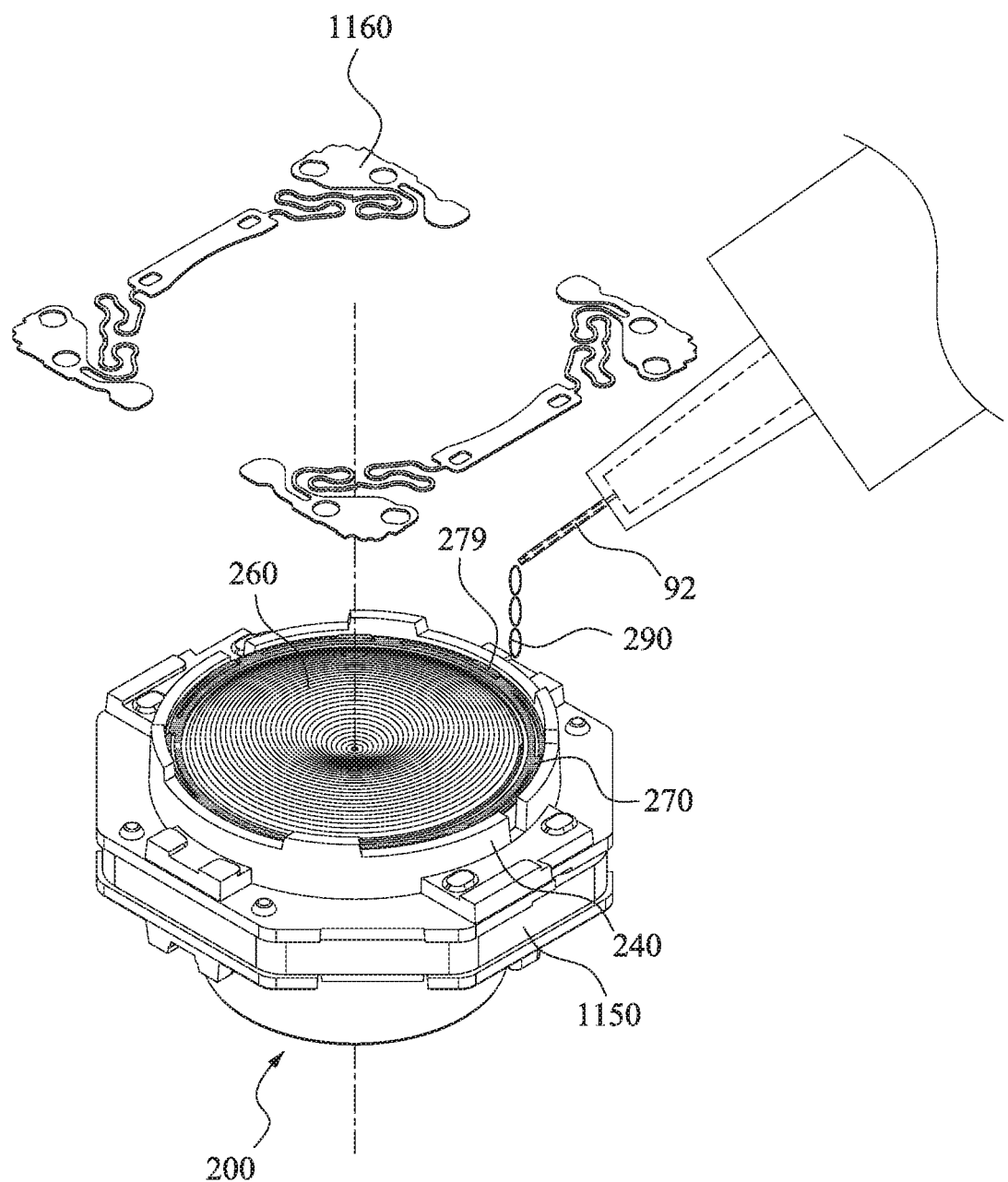
FIG. 2B is a schematic view of applying an adhesive layer according to the 2nd embodiment.

FIG. 2A is an exploded view of a metal retainer 270, an image-side lens element 260 and a plastic barrel 240 of an imaging lens assembly 200 according to the 2nd embodiment of the present disclosure. FIG. 2B is a schematic view of applying an adhesive layer 290 according to the 2nd embodiment. In FIG. 2A and FIG. 2B, the imaging lens assembly 200 includes the plastic barrel 240, a lens set and the metal retainer 270. The metal retainer 270 is for fixedly disposing the lens set in the plastic barrel 240. The lens set has an optical axis (its reference numeral is omitted) and includes a plurality of lens elements (only the image-side lens element 260 of the lens elements shown in FIG. 2A). The optical axis of the lens set is also an optical axis of the imaging lens assembly 200. The image-side lens element 260 is one of the lens elements closest to an image side of the lens set. The metal retainer 270 is disposed in an image-side direction of the image-side lens element 260. In addition, the plastic barrel 240 of the imaging lens assembly 200 and an autofocus assembly (including a wire element 8250, a lower leaf spring 8260 and etc.) may be assembled to be a camera module (not completely shown), as shown in FIG. 2A. The plastic barrel 240 of the imaging lens assembly 200 and an autofocus assembly (including a wire element 1150, a lower leaf spring 1160 and etc.) may be assembled to be another camera module (not completely shown), as shown in FIG. 2B.

Figure 2C:
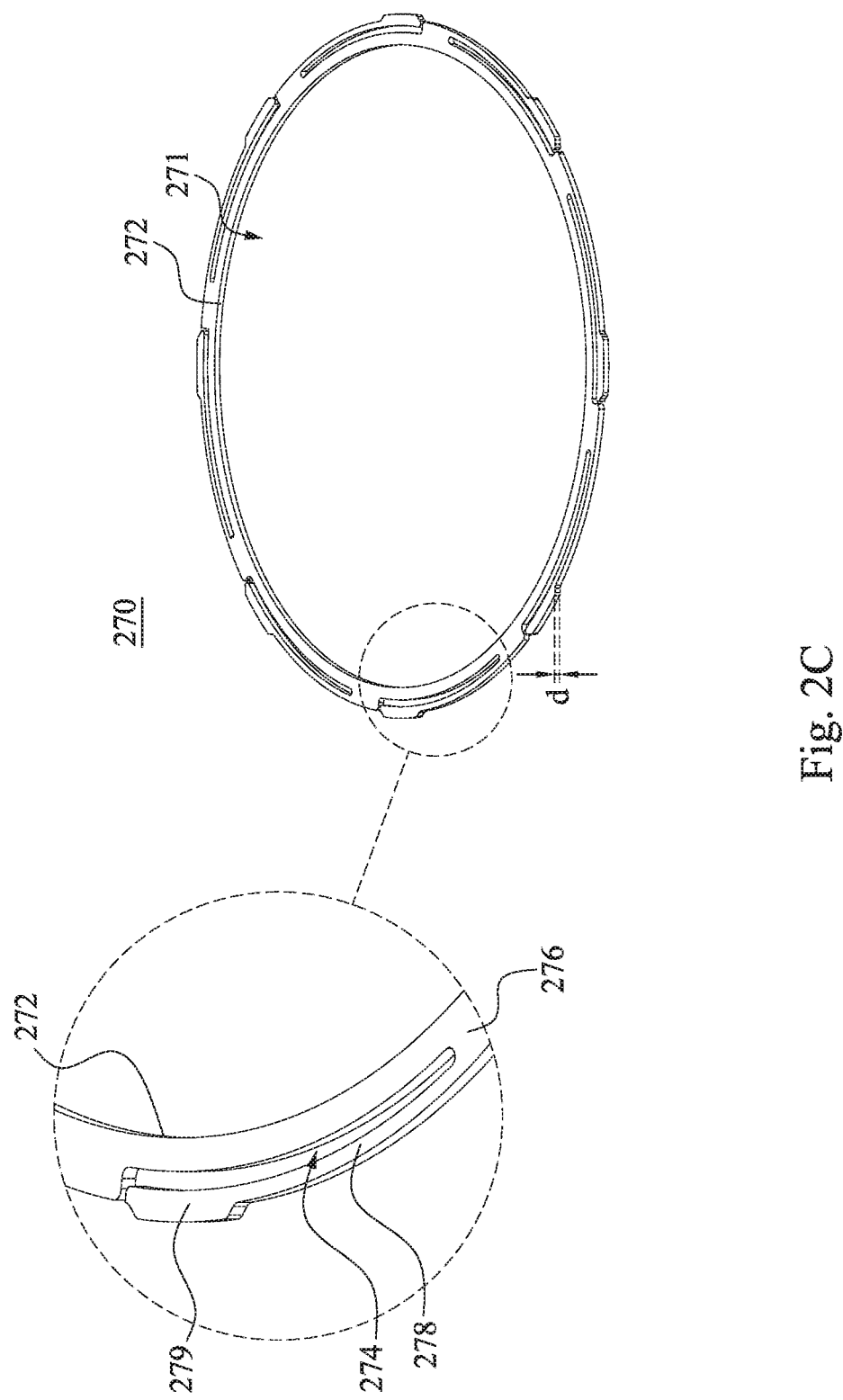
FIG. 2C is a three-dimensional view of a metal retainer according to the 2nd embodiment.
Figure 2D:
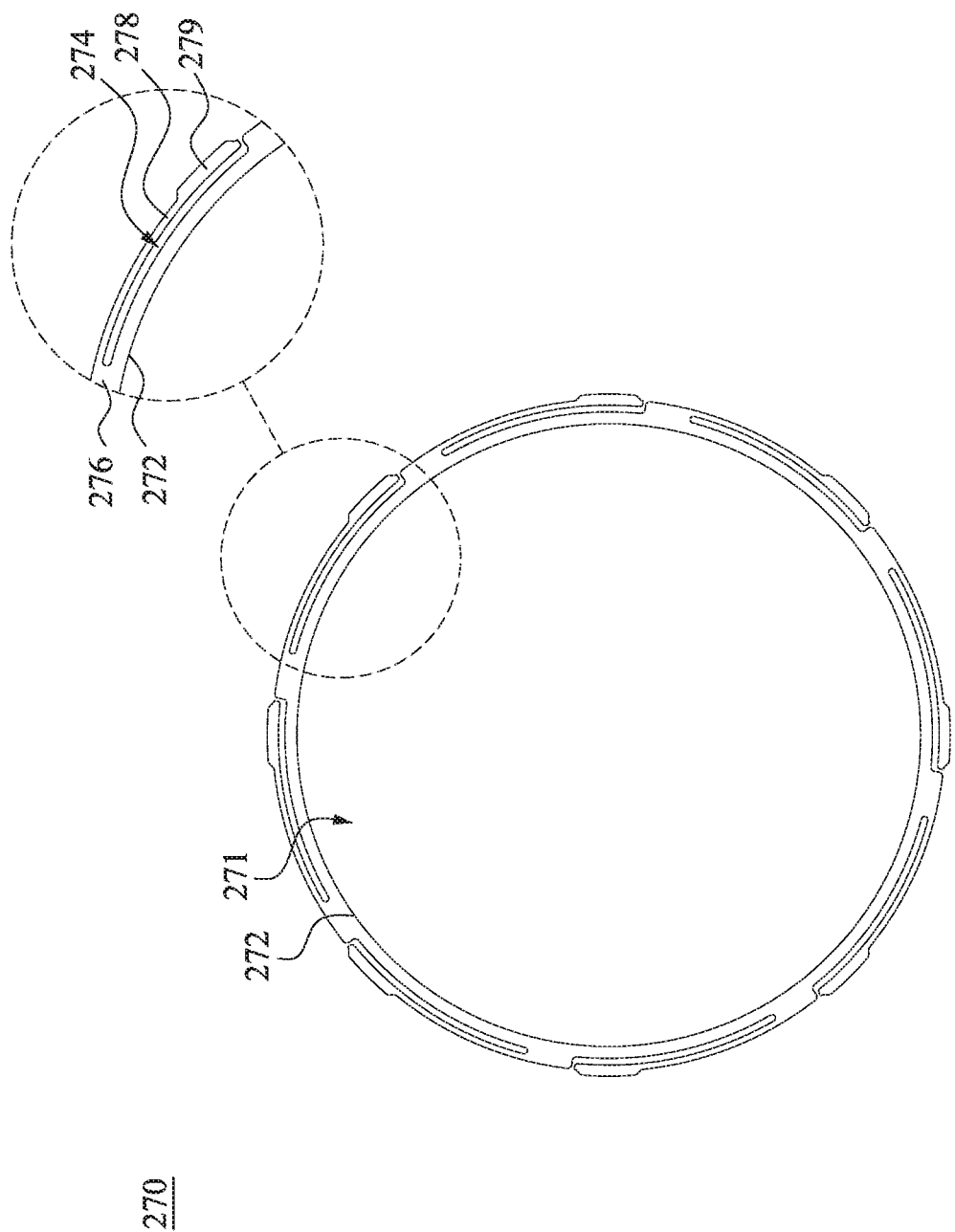
FIG. 2D is a side view of the metal retainer according to the 2nd embodiment.

FIG. 2C is a three-dimensional view of the metal retainer 270 according to the 2nd embodiment. FIG. 2D is a side view, observed from the image side, of the metal retainer 270 according to the 2nd embodiment. In FIG. 2A to FIG. 2D, the metal retainer 270 is in a circularly annular shape and includes an inner annular portion 272, a plurality of fixing portions 279 and a plurality of elastic portions 278. The inner annular portion 272 forms a through hole 271 of the metal retainer 270. The optical axis passes through the through hole 271. The fixing portions 279 directly contact the plastic barrel 240 for the metal retainer 270 to be fixedly disposed in the plastic barrel 240. At least one of the elastic portions 278 connects the inner annular portion 272 and at least one of the fixing portions 279.

Moreover, in FIG. 2C and FIG. 2D, the elastic portions 278 of the metal retainer 270 surround the inner annular portion 272. The optical axis passes through the through hole 271 of the metal retainer 270. An appearance of each of the elastic portions 278 is in a strip arc shape with a constant width, and the elastic portions 278 are not overlapped along a radiation direction of the optical axis.

In the 2nd embodiment, a number of the fixing portions 279 of the metal retainer 270 is eight. An appearance of each of the fixing portions 279 is in the same arc shape. The eight fixing portions 279 are regularly arranged with the same spaces along a circumferential direction of the optical axis. That is, the eight fixing portions 279 discretely surround the inner annular portion 272 and the through hole 271. One end of each of the fixing portions 279 is connected to one of the elastic portions 278, and the other end of each of the fixing portions 279 is an open end. A number of the elastic portions 278 of the metal retainer 270 is eight. An appearance of each of the elastic portions 278 is in the same arc shape. The eight elastic portions 278 are arranged along the circumferential direction of the optical axis. That is, the eight elastic portions 278 discretely surround the inner annular portion 272 and the through hole 271. One end of each of the elastic portions 278 is directly connected to one of the fixing portions 279, and the other end of each of the elastic portions 278 is directly connected to one of a plurality of frame portions 276. The one of the frame portions 276 is directly connected to the inner annular portion 272, that is, the other end of each of the elastic portions 278 is indirectly connected to the inner annular portion 272. Thus, a number Nf of the fixing portions 279 of the metal retainer 270 is eight, a number Ne of the elastic portions 278 of the metal retainer 270 is eight, and the condition Nf=Ne is satisfied, i.e. the number Nf of the fixing portions 279 is equal to the number Ne of the elastic portions 278. Furthermore, a length along the radiation direction of the optical axis of each of the frame portions 276 is greater than a length along the radiation direction of each of the fixing portions 279, and the length along the radiation direction of each of the fixing portions 279 is greater than a length along the radiation direction of each of the elastic portions 278.

In FIG. 2A and FIG. 2B, a position, which is assembled with the metal retainer 270, on an inner annular surface (its reference numeral is omitted) of the plastic barrel 240 is in a circular shape. The fixing portions 279 are the portions protruding most on the metal retainer 270, so that an outer annular surface (its reference numeral is omitted) of each of the fixing portions 279 directly contacts the inner annular surface of the plastic barrel 240 for the metal retainer 270 to be fixedly disposed in the plastic barrel 240.

Figure 2E:
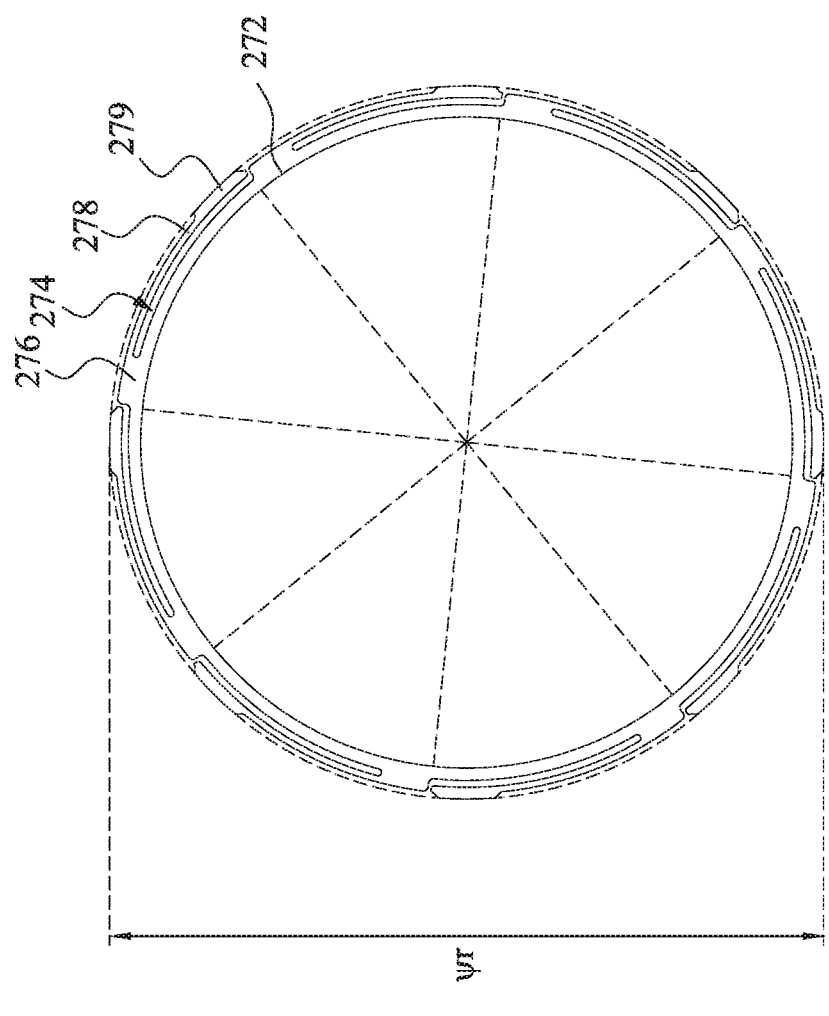
FIG. 2E is a schematic view of a maximum outer diameter of the metal retainer according to the 2nd embodiment.

FIG. 2E is a schematic view of a maximum outer diameter ψr of the metal retainer 270 according to the 2nd embodiment. In FIG. 2E, the outer annular surface of each of the fixing portions 279 is farther from the optical axis than both the elastic portions 278 and the frame portions 276 from the optical axis. A distance passing through the optical axis between two outer annular surfaces respectively of opposite two of the fixing portions 279 is the maximum outer diameter ψr of the metal retainer 270, and the maximum outer diameter ψr of the metal retainer 270 is 4.6 mm. As dashed lines shown in FIG. 2E, a circular circumference corresponding to the maximum outer diameter ψr (i.e. a virtual circular circumference defined by the maximum outer diameter ψr as a diameter thereof) is equally divided into eight parts. An arc length of the fixing portion 279 of each of the eight parts is 0.3468 mm. Accordingly, a length ratio between the eight fixing portions 279 and the circular circumference corresponding to the maximum outer diameter ψr of the metal retainer 270 minus the eight fixing portions 279 is 23.76%.

In FIG. 2C and FIG. 2D, a plurality of gaps 274 are disposed between the inner annular portion 272 and the fixing portions 279. In the 2nd embodiment, a number of the gaps 274 is eight. Each gap 274 is located correspondingly to one of the fixing portions 279 and one of the elastic portions 278, which is connected to one end of the one of the fixing portions 279. Each gap 274 is located between the inner annular portion 272 and the corresponding fixing portion 279, and also located between the inner annular portion 272 and the corresponding elastic portion 278.

In FIG. 2B, the imaging lens assembly 200 further includes the adhesive layer 290, which is applied on the metal retainer 270 and the plastic barrel 240. The adhesive layer 290 is an opaque adhesive layer. An appearance of the metal retainer 270 is black. The adhesive layer 290 is filled in at least one of the gaps 274, and the image-side lens element 260, the metal retainer 270 and the plastic barrel 240 are fixedly adhered by the adhesive layer 290.

Specifically, in an assembling procedure of the imaging lens assembly 200 shown as FIG. 2B, the lens elements (including the images-side lens element 260) and the metal retainer 270 are assembled in the plastic barrel 240 in order. A needle 92 is placed above the metal retainer 270, and the needle 92 and the plastic barrel 240 together with the metal retainer 270 have degrees of freedom to move or rotate relatively by fixtures (not shown in drawings) for the adhesive layer 290 to be intermittently applied on eight or other number positions of the metal retainer 270. In addition, the plastic barrel 240 can be assembled with some components of the camera module, e.g. the lower leaf spring 1160, after the adhesive layer 290 being applied. The metal retainer 270 and a non-optical-effective area, which surrounds an optical effective area of an image-side surface and is without reference numeral, of the image-side surface of the images-side lens element 260 are adhered mainly by the adhesive layer 290 filled in the gaps 274. The adhesive layer 290 before solidification flows along spaces among the elastic portions 278, the frame portions 276 and the plastic barrel 240 into spaces between the images-side lens element 260 and the plastic barrel 240, so that the image-side lens element 260, the metal retainer 270 and the plastic barrel 240 can be fixedly adhered by the adhesive layer 290.

Figure 2F:
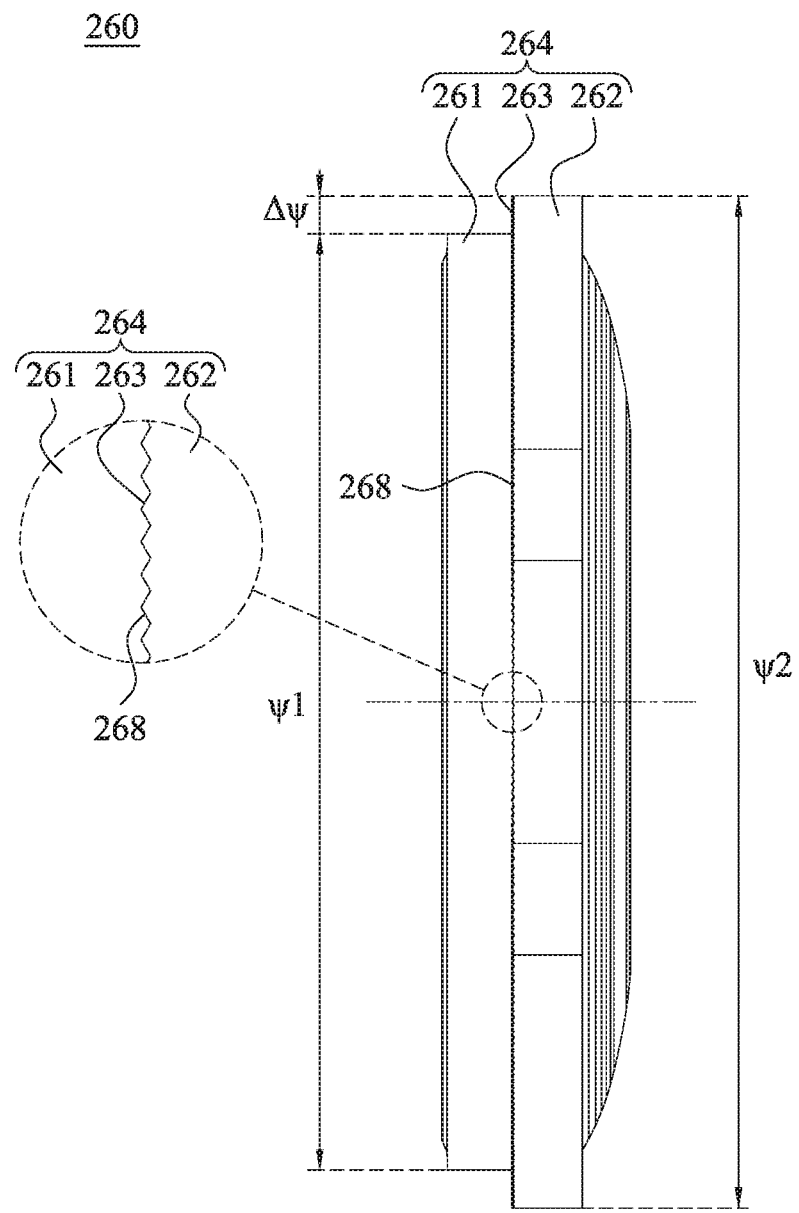
FIG. 2F is a side view of an image-side lens element according to the 2nd embodiment.

FIG. 2F is a side view, observed from a direction vertical to the optical axis, of the image-side lens element 260 according to the 2nd embodiment. In FIG. 2A, FIG. 2B and FIG. 2F, an outer diameter surface 264 includes a first outer diameter surface 261 and a second outer diameter surface 262 in order from the object side to the image side of the lens set. Only the first outer diameter surface 261 of the first outer diameter surface 261 and the second outer diameter surface 262 contacts the plastic barrel 240, and a step difference is formed by the first outer diameter surface 261 and the second outer diameter surface 262.

In the 2nd embodiment, a maximum outer diameter ψ1 of the first outer diameter surface 261 is smaller than a maximum outer diameter ψ2 of the second outer diameter surface 262. An inner diameter on the inner annular surface of the plastic barrel 240, which is configured to assembly with the first outer diameter surface 261, is smaller than an inner diameter on the inner annular surface of the plastic barrel 240, which is configured to assembly with the second outer diameter surface 262. Only the first outer diameter surface 261 of the first outer diameter surface 261 and the second outer diameter surface 262 contacts the plastic barrel 240.

In FIG. 2A and FIG. 2F, the image-side lens element 260 includes a plurality of strip-shaped wedge structures 268, and at least one of the strip-shaped wedge structures 268 directly contacts the adhesive layer 290. The strip-shaped wedge structures 268 are disposed between the first outer diameter surface 261 and the second outer diameter surface 262. In the 2nd embodiment, a transverse cross-sectional plane of each of the strip-shaped wedge structures 268 is in an upper narrow and lower wide shape, as shown in FIG. 2F. Adjacent two of the strip-shaped wedge structures 268 form a strip V-shaped groove, and an entirety of the strip-shaped wedge structures 268 form V-shaped grooves arranged in a radiation pattern.

Specifically, the outer diameter surface 264 of the image-side lens element 260 includes the first outer diameter surface 261, a step difference surface 263 and the second outer diameter surface 262 in order from the object side to the image side of the lens set. The second outer diameter surface 262 includes a recessed portion 267 caused by a cutting trace of an injection gate. A normal direction of the first outer diameter surface 261 and a normal direction of the second outer diameter surface 262 are both vertical to the optical axis, and a normal direction of the step difference surface 263 is parallel to the optical axis. The strip-shaped wedge structures 268 are disposed on the step difference surface 263 and regularly arranged with the same spaces along the circumferential direction of the optical axis. Each of the strip-shaped wedge structures 268 has the same structure and is disposed in the radiation direction of the optical axis. The adhesive layer 290 flows from spaces between the second outer diameter surface 262 (including the recessed portion 267) and the inner annular surface of the plastic barrel 240 to the at least one of the strip-shaped wedge structures 268. It is beneficial to prevent the adhesive layer 290 from continuously overflowing to the first outer diameter surface 261, so that the image-side lens element 260, the metal retainer 270 and the plastic barrel 240 are fixedly adhered by the adhesive layer 290.

The data of the parameters of the imaging lens assembly 200 according to the 2nd embodiment of the present disclosure are listed in the following Table 2, wherein the parameters are also shown as FIG. 2C, FIG. 2E and FIG. 2F. The definitions of these parameters shown in Table 2 are the same as those stated in the 1st embodiment with corresponding values in the 2nd embodiment.

TABLE 2

| 2nd Embodiment | | | |
|---|---|---|---|
| d (mm) | 0.04 | ψ1 (mm) | 4.2 |
| ψr (mm) | 4.6 | ψ2 (mm) | 4.54 |
| f % | 23.76% | Δψ (mm) | 0.17 |

TABLE 2-continued

2nd Embodiment

| | | | |
|---|---|---|---|
| Nf | 8 | n | 360 |
| Ne | 8 | | |

3rd Embodiment

Figure 3A:
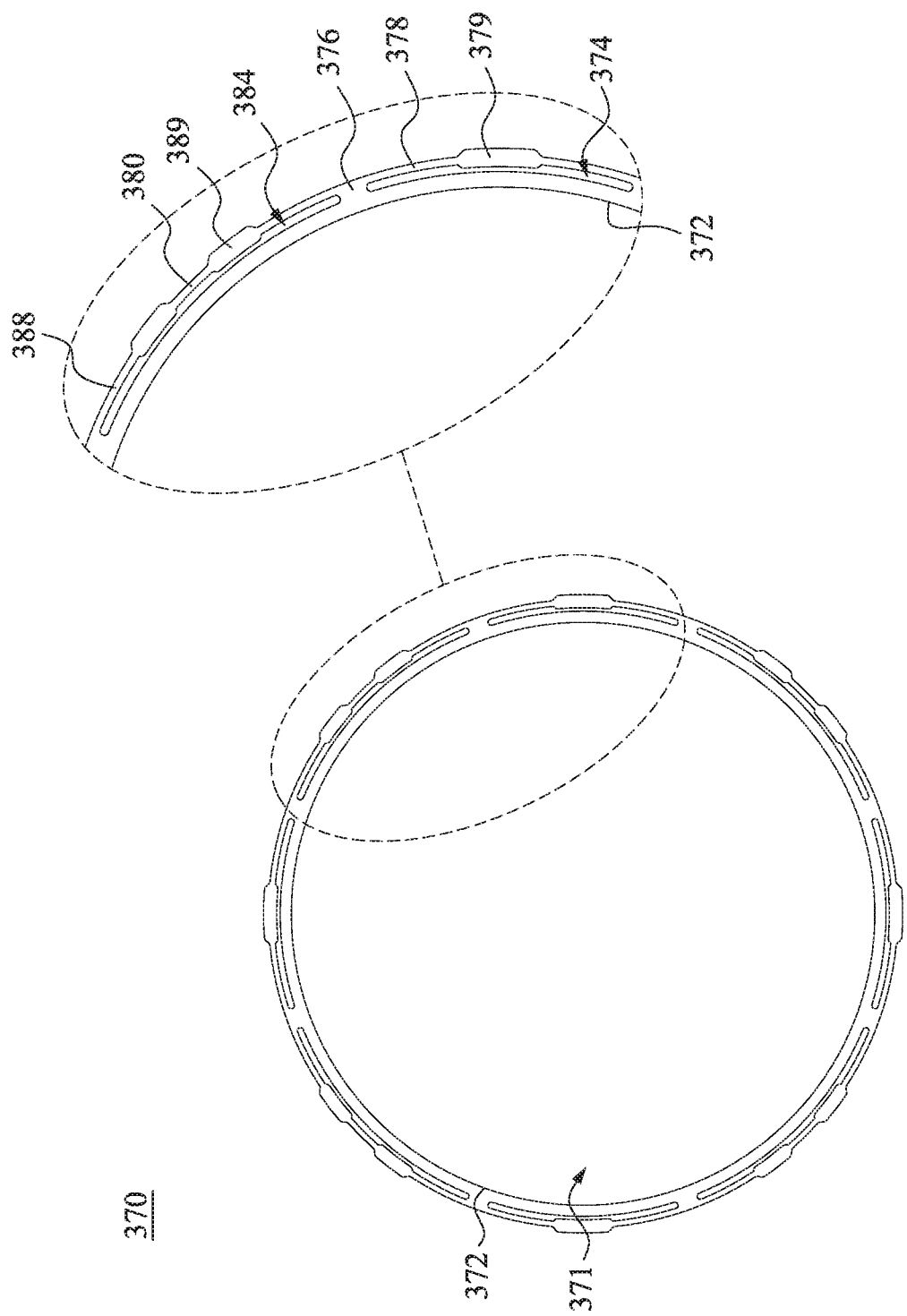
FIG. 3A is a side view of a metal retainer according to the 3rd embodiment of the present disclosure.

FIG. 3A is a side view, observed from an object side or an image side (i.e. from a position on an optical axis), of a metal retainer 370 according to the 3rd embodiment of the present disclosure. In the 3rd embodiment, an imaging lens assembly includes a plastic barrel, a lens set and the metal retainer 370. The metal retainer 370 is for fixedly disposing the lens set in the plastic barrel. The imaging lens assembly may further include an adhesive layer. Furthermore, the plastic barrel, the lens set (including an images-side lens element), the adhesive layer and the configurations thereamong may be the same as the plastic barrel 140, the lens set 150 (including the images-side lens element 160), the adhesive layer 190 and the configurations thereamong recited in the aforementioned 1st embodiment, or the plastic barrel 240, the lens set (including the images-side lens element 260), the adhesive layer 290 and the configurations thereamong recited in the aforementioned 2nd embodiment.

In FIG. 3A, the metal retainer 370 is in a circularly annular shape and includes an inner annular portion 372, a plurality of fixing portions 379, 389 and a plurality of elastic portions 378, 380, 388. The inner annular portion 372 forms a through hole 371 of the metal retainer 370. The optical axis (its reference numeral is omitted) passes through the through hole 371. The fixing portions 379 and 389 directly contact the plastic barrel for the metal retainer 370 to be fixedly disposed in the plastic barrel. At least one of the elastic portions 378 connects the inner annular portion 372 and at least one of the fixing portions 379. At least one of the elastic portions 388 connects the inner annular portion 372 and at least one of the fixing portions 389.

Moreover, an appearance of the metal retainer 370 is black. The elastic portions 378, 380 and 388 discretely surround the inner annular portion 372 and the through hole 371. The optical axis passes through the through hole 371 of the metal retainer 370. An appearance of each of the elastic portions 378, each of the elastic portions 380 and each of the elastic portions 388 is in a strip arc shape with a constant width, and the elastic portions 378, 380 and 388 are not overlapped along a radiation direction of the optical axis.

In the 3rd embodiment, a number of the fixing portions 379 of the metal retainer 370 is four. An appearance of each of the fixing portions 379 is in the same arc shape. The four fixing portions 379 are regularly arranged with the same spaces along a circumferential direction of the optical axis. Two ends of each of the fixing portions 379 are respectively connected to two of the elastic portions 378. A number of the elastic portions 378 of the metal retainer 370 is eight. An appearance of each of the elastic portions 378 is in the same arc shape. The eight elastic portions 378 are arranged along the circumferential direction of the optical axis. One end of each of the elastic portions 378 is directly connected to one of the fixing portions 379, and the other end of each of the elastic portions 378 is directly connected to one of a plurality of frame portions 376. The one of the frame portions 376 is directly connected to the inner annular portion 372, that is, the other end of each of the elastic portions 378 is indirectly connected to the inner annular portion 372.

A number of the fixing portions 389 of the metal retainer 370 is eight. An appearance of each of the fixing portions 389 is in the same arc shape. The eight fixing portions 389 are arranged along the circumferential direction of the optical axis. Furthermore, two of the fixing portions 389 and one of the fixing portions 379 are alternately arranged along the circumferential direction of the optical axis. A number of the elastic portions 380 is four. Two ends of each of the elastic portions 380 are respectively connected to two of the fixing portions 389. An appearance of each of the elastic portions 380 is in the same arc shape. The four elastic portions 380 are arranged along the circumferential direction of the optical axis. A number of the elastic portions 388 is eight. An appearance of each of the elastic portions 388 is in the same arc shape. The eight elastic portions 388 are arranged along the circumferential direction of the optical axis. One end of each of the elastic portions 388 is directly connected to one of the fixing portions 389, and the other end of each of the elastic portions 388 is directly connected to one of a plurality of frame portions 376. The one of the frame portions 376 is directly connected to the inner annular portion 372, that is, the other end of each of the elastic portions 388 is indirectly connected to the inner annular portion 372.

Thus, a number Nf, which is a number of the fixing portions 379 plus a number of the fixing portions 389, of the metal retainer 370 is twelve. A number Ne, which is a number of the elastic portions 378 plus a number of the elastic portions 380 and a number of the elastic portions 388, of the metal retainer 370 is twenty. The condition Nf<Ne is satisfied, i.e. the number Nf of the fixing portions 379 and 389 is smaller than the number Ne of the elastic portions 378, 380 and 388. Furthermore, a length along the radiation direction of the optical axis of each of the frame portions 376 is greater than a length along the radiation direction of each portion of the fixing portions 379 and 389, and the length along the radiation direction of each portion of the fixing portions 379 and 389 is greater than a length along the radiation direction of each portion of the elastic portions 378, 380 and 388.

Figure 3B:
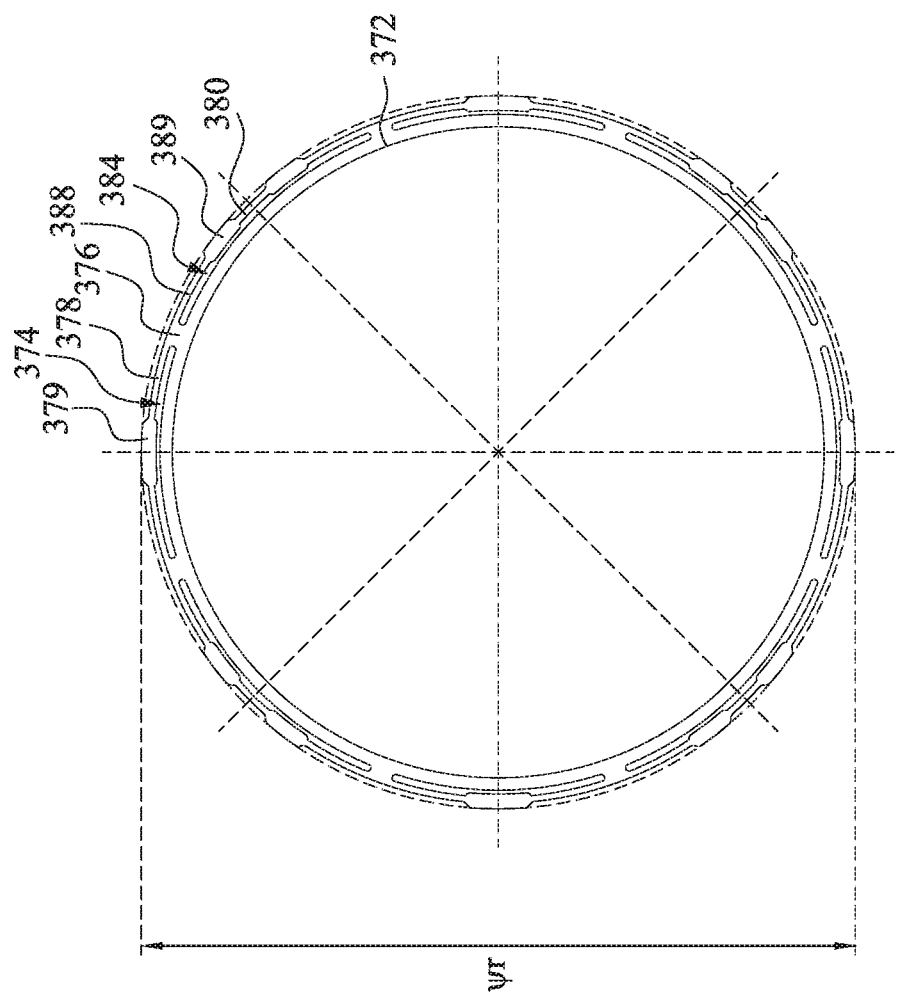
FIG. 3B is a schematic view of a maximum outer diameter of the metal retainer according to the 3rd embodiment.

FIG. 3B is a schematic view of a maximum outer diameter $\psi r$ of the metal retainer 370 according to the 3rd embodiment. In FIG. 3B, an outer annular surface (its reference numeral is omitted) of each portion of the fixing portions 379 and 389 is farther from the optical axis than all the elastic portions 378, 380, 388 and the frame portions 376 from the optical axis. A distance passing through the optical axis between two outer annular surfaces respectively of opposite two of the fixing portions 379, and a distance passing through the optical axis between two outer annular surfaces respectively of opposite two of the fixing portions 389 are both the maximum outer diameters $\psi r$ of the metal retainer 370, and the maximum outer diameter $\psi r$ of the metal retainer 370 is 4.6 mm. As dashed lines shown in FIG. 3B, a circular circumference corresponding to the maximum outer diameter $\psi r$ (i.e. a virtual circular circumference defined by the maximum outer diameter $\psi r$ as a diameter thereof) is equally divided into eight parts. An arc length of the fixing portion 379 of each of the eight parts is 0.1734 mm (i.e. an arc length of half fixing portion 379), and an arc length of the fixing portion 389 of each of the eight parts is 0.2263 mm. Accordingly, a length ratio between the fixing portions 379, 389 and the circular circumference corresponding to the maximum outer diameter $\psi r$ of the metal retainer 370 minus the fixing portions 379, 389 is 28.41%.

In FIG. 3A, a plurality of gaps 374 are disposed between the inner annular portion 372 and the fixing portions 379, and a plurality of gaps 384 are disposed between the inner annular portion 372 and the fixing portions 389. In the 3rd embodiment, a number of the gaps 374 is four. Each gap 374 is located correspondingly to one of the fixing portions 379 and two of the elastic portions 378, which are respectively connected to two ends of the one of the fixing portions 379. Each gap 374 is located between the inner annular portion 372 and the corresponding fixing portion 379, and also located between the inner annular portion 372 and the two corresponding elastic portions 378. A number of the gaps 384 is four. Each gap 384 is located correspondingly to two of the fixing portions 389, one of the elastic portions 380 and two of the elastic portions 388. Each gap 384 is located between the inner annular portion 372 and the two corresponding fixing portion 389, and also located between the inner annular portion 372 and the corresponding elastic portion 380 together with the two corresponding elastic portions 388.

The data of the parameters of the metal retainer 370 of the imaging lens assembly according to the 3rd embodiment of the present disclosure are listed in the following Table 3, wherein the parameters are also shown as FIG. 3B. The definitions of these parameters shown in Table 3 are the same as those stated in the 1st embodiment with corresponding values in the 3rd embodiment.

TABLE 3

| 3rd Embodiment | | | |
|---|---|---|---|
| d (mm) | 0.1 | Nf | 12 |
| ψr (mm) | 4.6 | Ne | 20 |
| f % | 28.41% | | |

4th Embodiment

Figure 4A:
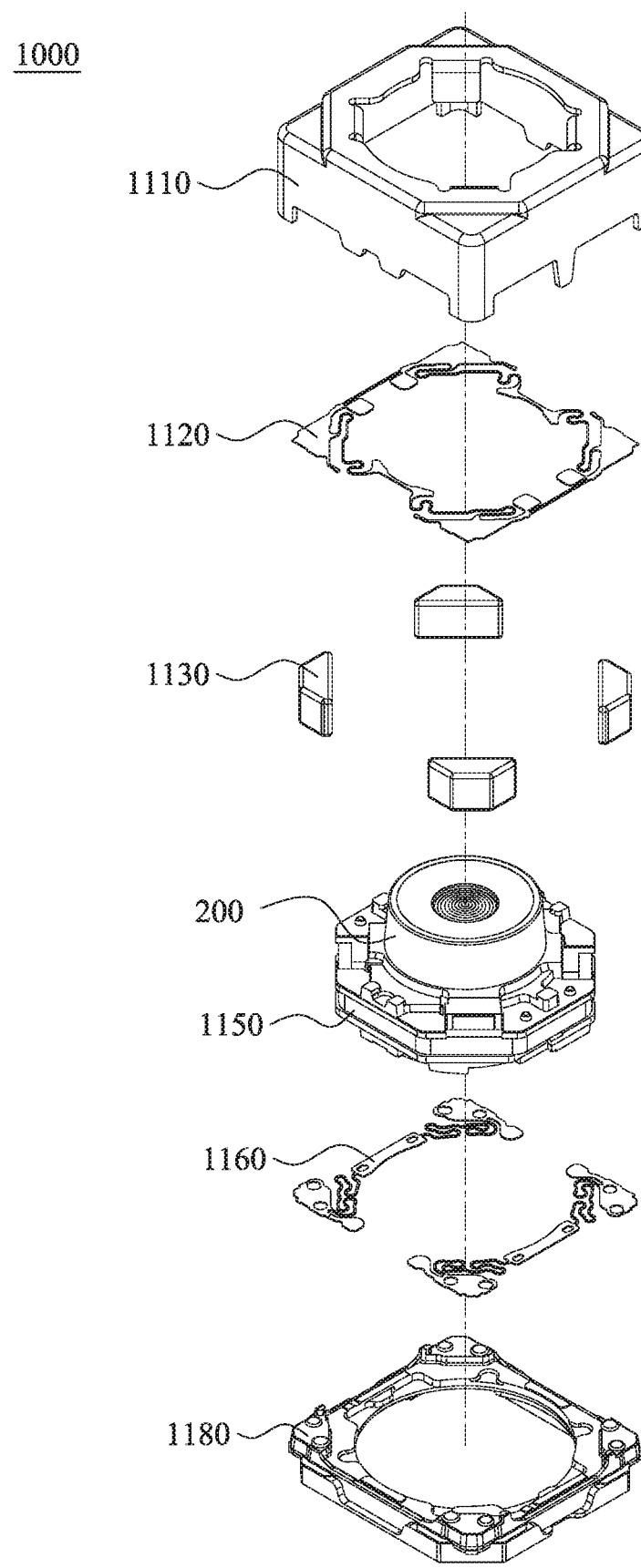
FIG. 4A is an exploded view of a camera module according to the 4th embodiment of the present disclosure.
Figure 4B:
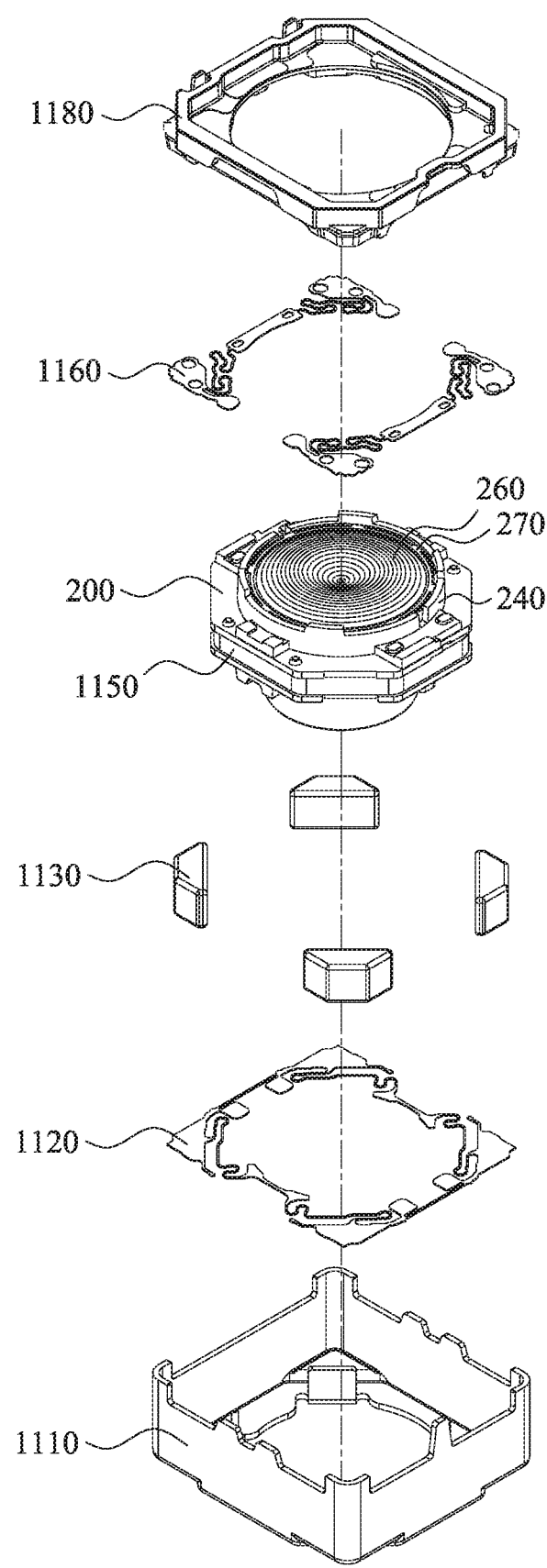
FIG. 4B is another exploded view of the camera module according to the 4th embodiment.

FIG. 4A is an exploded view of a camera module 1000 according to the 4th embodiment of the present disclosure. FIG. 4B is another exploded view of the camera module 1000 according to the 4th embodiment. In FIG. 4A and FIG. 4B, the camera module 1000 includes the imaging lens assembly 200 recited in the aforementioned 2nd embodiment. Therefore, it is favorable for satisfying the increasing compact requirements of the camera module 1000. The other details of the imaging lens assembly 200 have been described in the foregoing paragraphs of the 2nd embodiment and will not be described again herein.

Specifically, the camera module 1000 includes the imaging lens assembly 200 and an autofocus assembly, and may further include an optical anti-shake mechanism. The autofocus assembly includes a metal cover 1110, an upper leaf spring 1120, four magnets 1130, the wire element 1150, the two lower leaf springs 1160 and a holder 1180. The autofocus assembly further includes conducting elements, input terminals and output terminals (not shown in drawings) for implementing an autofocus driving circuit. By the autofocus assembly, the imaging lens assembly 200 is able to displace along a direction parallel to an optical axis relative to the holder 1180 for achieving an autofocus function. In addition, the metal retainer 270 being the spring sheet type has the proper thickness, so that the mechanical interference inside the camera module 1000, which is resulted from an overly large thickness and affects the operation of the camera module 1000, can be avoided.

5th Embodiment

Figure 5A:
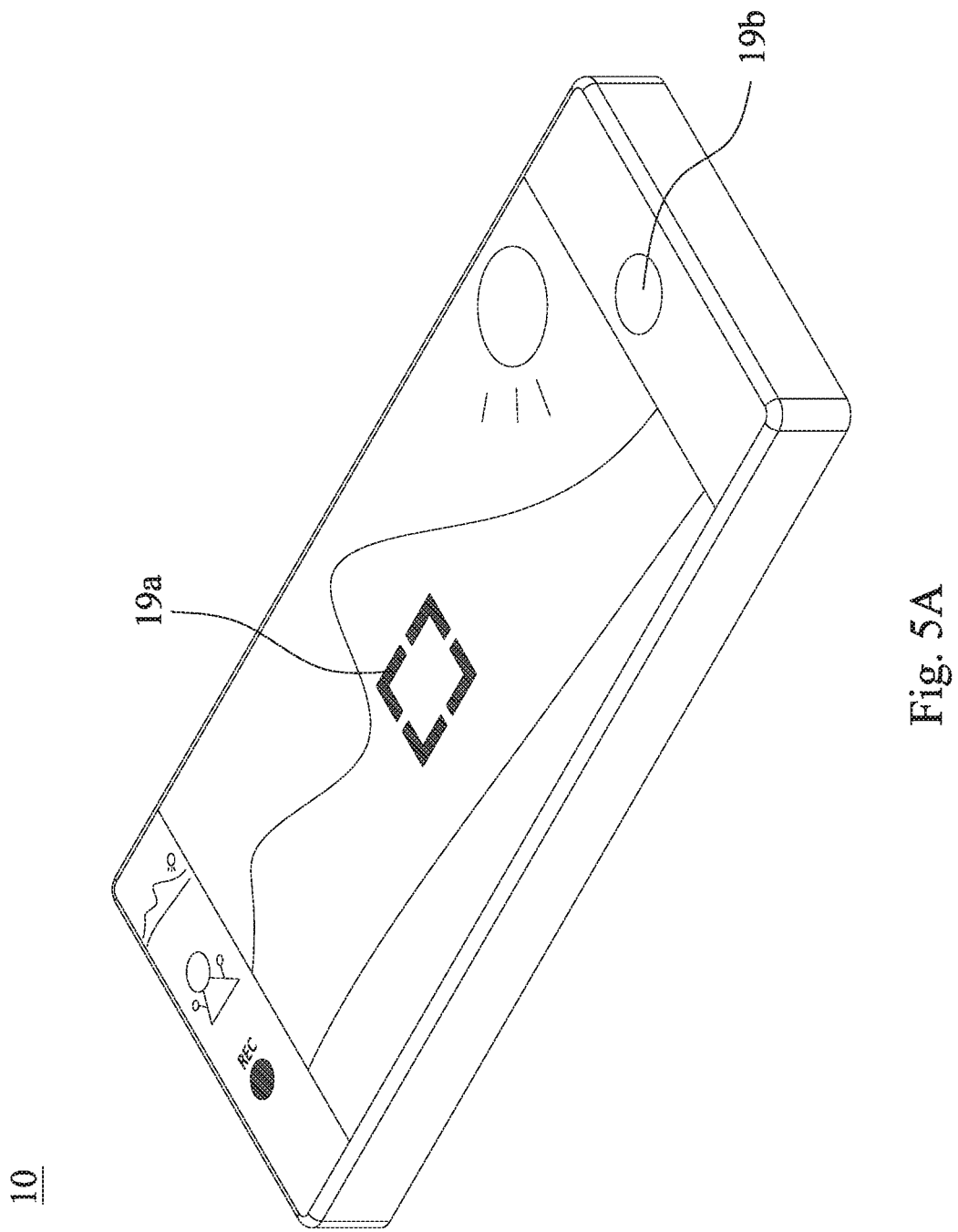
FIG. 5A shows a schematic view of an electronic device according to the 5th embodiment of the present disclosure.
Figure 5B:
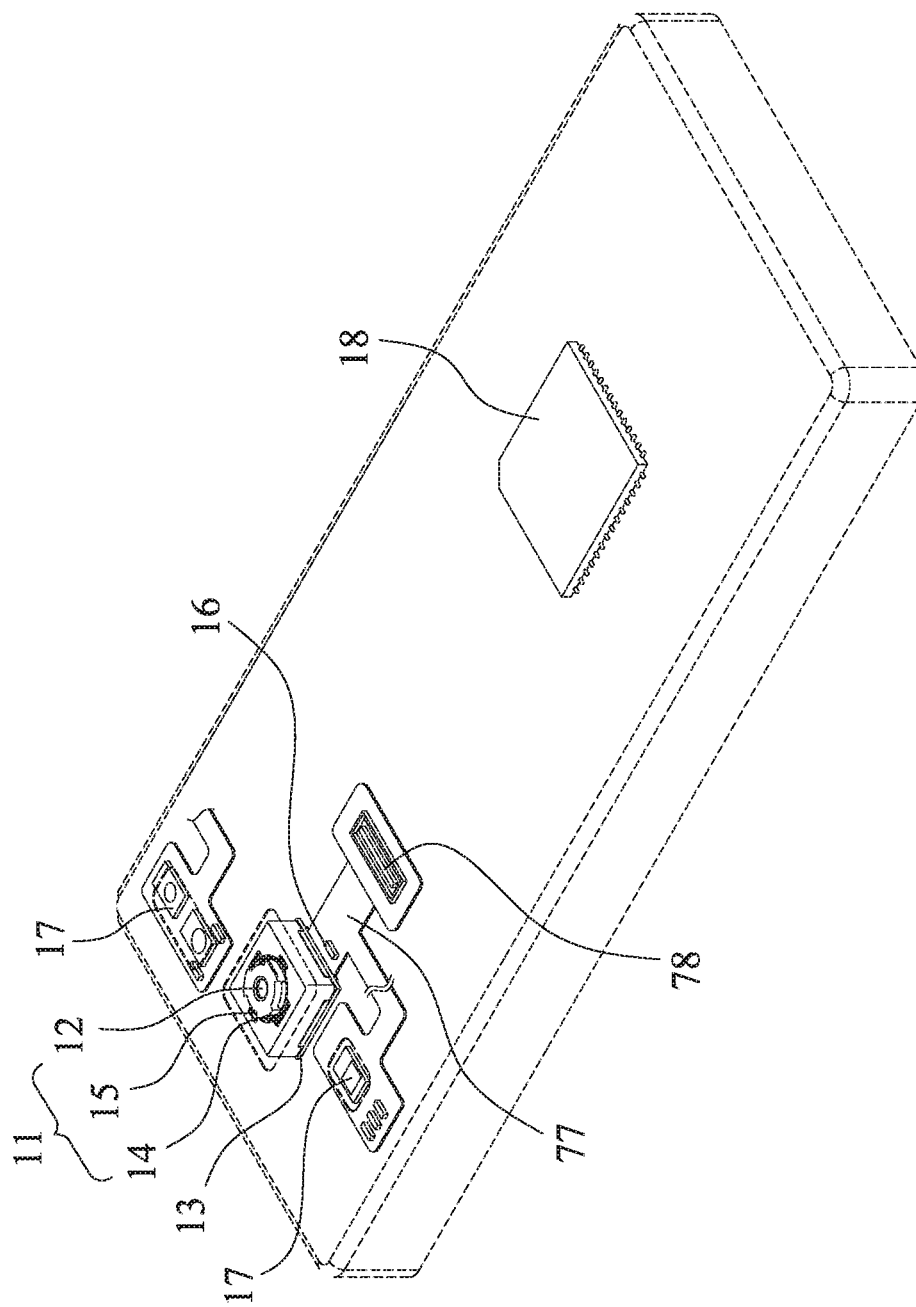
FIG. 5B shows another schematic view of the electronic device according to the 5th embodiment.

FIG. 5A shows a schematic view of an electronic device 10 according to the 5th embodiment of the present disclosure, FIG. 5B shows another schematic view of the electronic device 10 according to the 5th embodiment, and particularly, FIG. 5A and FIG. 5B are schematic views related to a camera of the electronic device 10. In FIG. 5A and FIG. 5B, the electronic device 10 of the 5th embodiment is a smart phone. The electronic device 10 includes a camera module 11 and an image sensor 13, wherein the camera module 11 includes an imaging lens assembly 12 according to the present disclosure, and the image sensor 13 is disposed on an image surface (not shown in drawings) of the camera module 11. Therefore, a better image quality can be achieved, and hence the high-end imaging requirements of modern electronic devices can be satisfied.

Furthermore, the user activates the capturing mode via a user interface 19 of the electronic device 10, wherein the user interface 19 of the 5th embodiment can be a touch screen 19a, a button 19b and etc. At this moment, the imaging light of the imaging lens assembly 12 is converged on the image sensor 13, and the electronic signal associated with image is output to an image signal processor (ISP) 18.

Figure 5C:
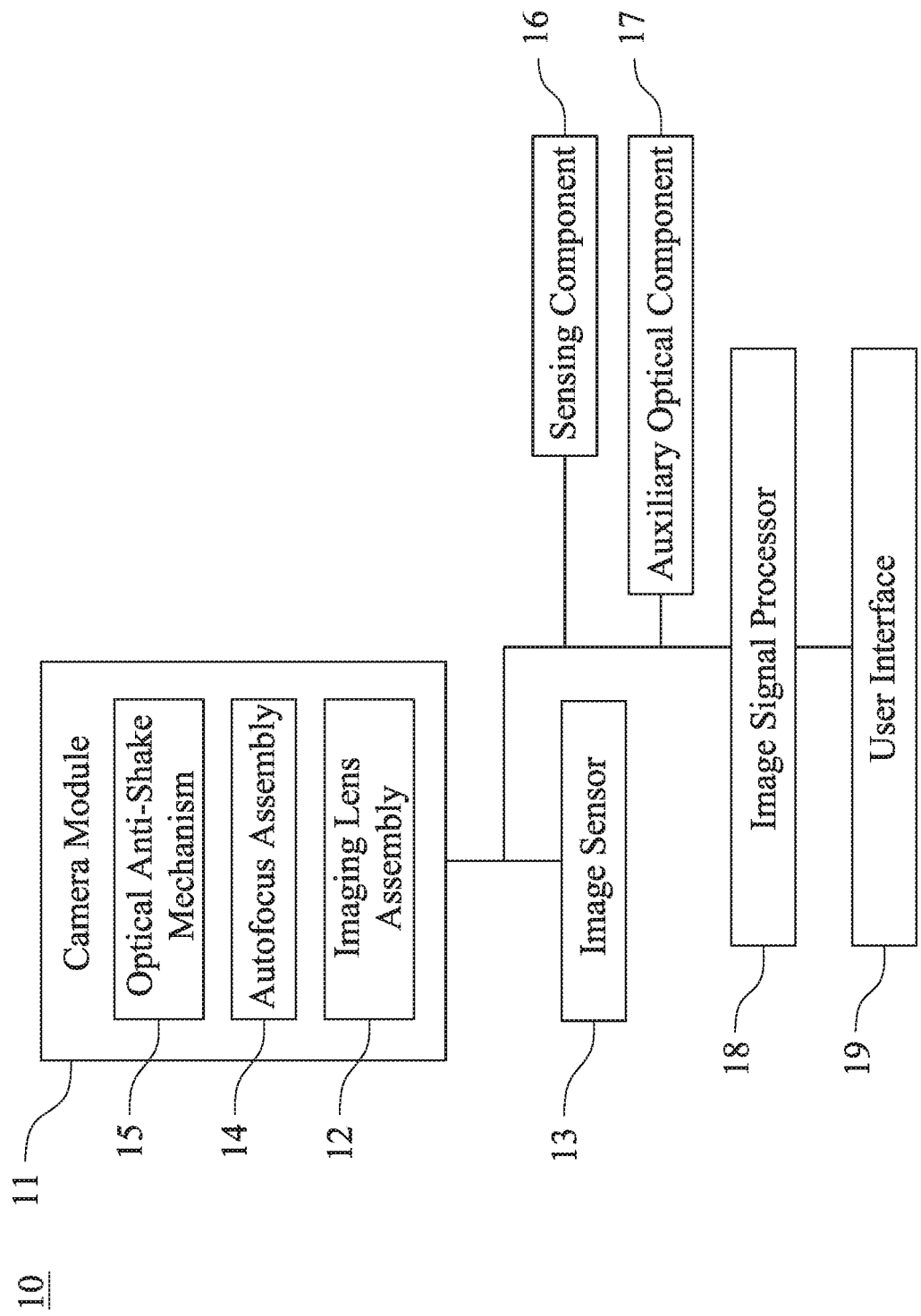
FIG. 5C shows a block diagram of the electronic device according to the 5th embodiment.

FIG. 5C shows a block diagram of the electronic device 10 according to the 5th embodiment, and in particular, the block diagram is related to the camera of the electronic device 10. In FIG. 5A to FIG. 5C, the camera module 11 can further include an autofocus assembly 14 and an optical anti-shake mechanism 15 based on the camera specification of the electronic device 10. Moreover, the electronic device 10 can further include at least one auxiliary optical component 17 and at least one sensing component 16. The auxiliary optical component 17 can be a flash module for compensating for the color temperature, an infrared distance measurement component, a laser focus module and etc. The sensing component 16 can have functions for sensing physical momentum and kinetic energy, and thereby can be an accelerator, a gyroscope, and a Hall effect element, to sense shaking or jitters applied by hands of the user or external environments. Accordingly, the functions of the autofocus assembly 14 and the optical anti-shake mechanism 15 of the camera module 11 can be aided and enhanced to achieve the superior image quality. Furthermore, the electronic device 10 according to the present disclosure can have a capturing function with multiple modes, such as taking optimized selfies, high dynamic range (HDR) under a low light condition, 4K resolution recording, etc. Additionally, the user can visually see the captured image of the camera through the touch screen 19a and manually operate the view finding range on the touch screen 19a to achieve the auto focus function of what you see is what you get.

Furthermore, in FIG. 5B, the camera module 11, the sensing component 16 and the auxiliary optical component 17 can be disposed on a flexible printed circuit board (FPC) 77 and electrically connected with the associated components, such as the imaging signal processor 18, via a connector 78 to perform a capturing process. Since the current electronic devices, such as smart phones, have a tendency of being compact, the way of firstly disposing the camera module and related components on the flexible printed circuit board and secondly integrating the circuit thereof into the main board of the electronic device via the connector can satisfy the requirements of the mechanical design and the circuit layout of the limited space inside the electronic device, and obtain more margins. The autofocus function of the camera module can also be controlled more flexibly via the touch screen of the electronic device. In the 5th embodiment, the electronic device 10 includes a plurality of sensing components 16 and a plurality of auxiliary optical components 17. The sensing components 16 and the auxiliary optical components 17 are disposed on the flexible printed circuit board 77 and at least one other flexible printed circuit board (its reference numeral is omitted) and electrically connected with the associated components, such as the image signal processor 18, via corresponding connectors to perform the capturing process. In other embodiments (not shown herein), the sensing components and the auxiliary optical components can also be disposed on the main board of the electronic device or carrier boards of other types according to requirements of the mechanical design and the circuit layout.

In addition, the electronic device 10 can further include but not be limited to a wireless communication unit, a control unit, a storage unit, a random access memory, a read-only memory, or a combination thereof.

6th Embodiment

Figure 6:
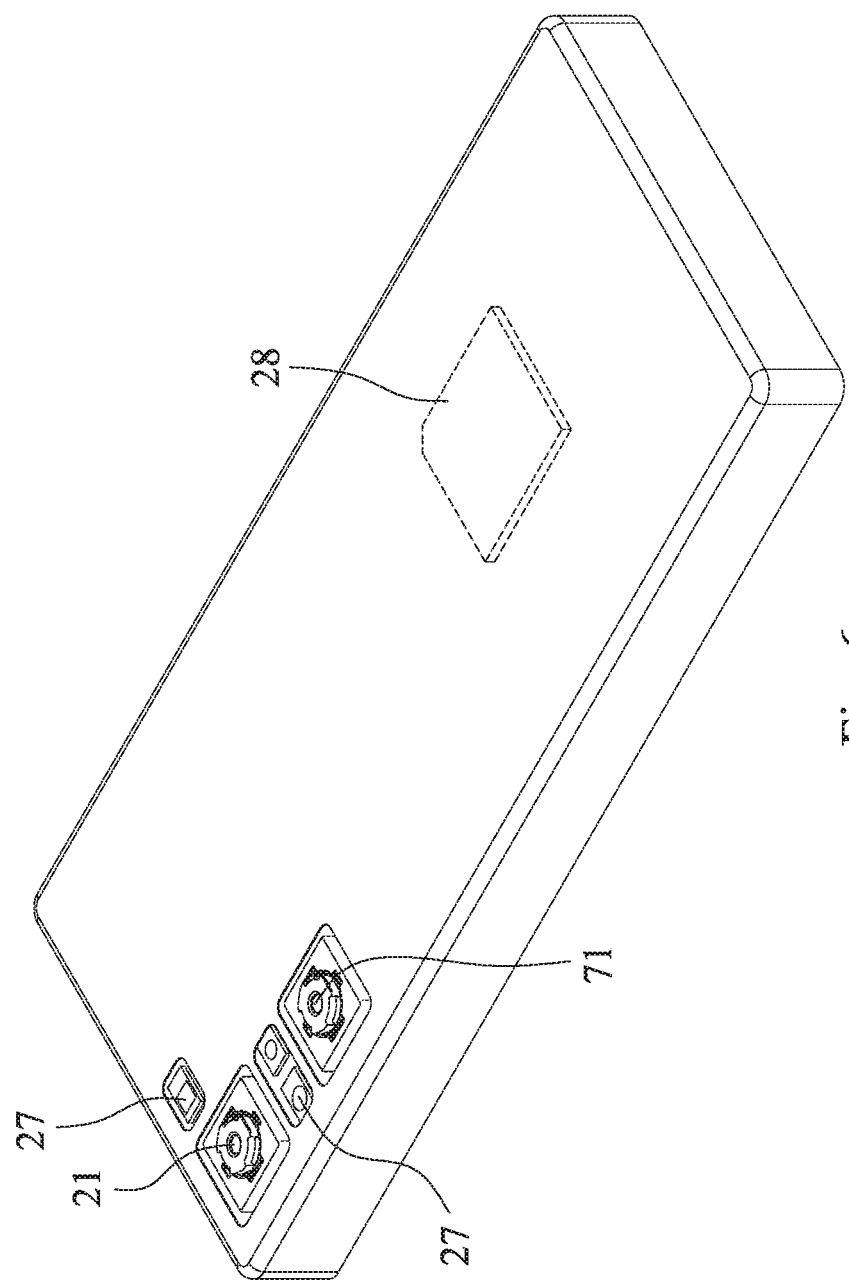
FIG. 6 shows an electronic device according to the 6th embodiment of the present disclosure.

FIG. 6 shows an electronic device 20 according to the 6th embodiment of the present disclosure. In FIG. 6, the electronic device 20 of the 6th embodiment is a smart phone. The electronic device 20 includes camera modules 21, 71 and two image sensors (not shown in drawings) respectively corresponding to thereof. The camera module 21 includes an imaging lens assembly (not shown in drawings), and the corresponding image sensor is disposed on an image surface of the camera module 21. The camera module 71 includes an imaging lens assembly (not shown in drawings), and the corresponding image sensor is disposed on an image surface of the camera module 71.

Furthermore, at least one of the imaging lens assembly of the camera module 21 and the imaging lens assembly of the camera module 71 is an imaging lens assembly according to the present disclosure, and the two imaging lens assemblies may not have the same optical properties. In the photographing procedure of the electronic device 20, two images can be captured by the camera modules 21 and 71 with an aid of an auxiliary optical component 27, and then the required effects like zooming, delicate images would be achieved by the processors (such as an image signal processor 28 and so on) equipped in the electronic device 20.

7th Embodiment

Figure 7:
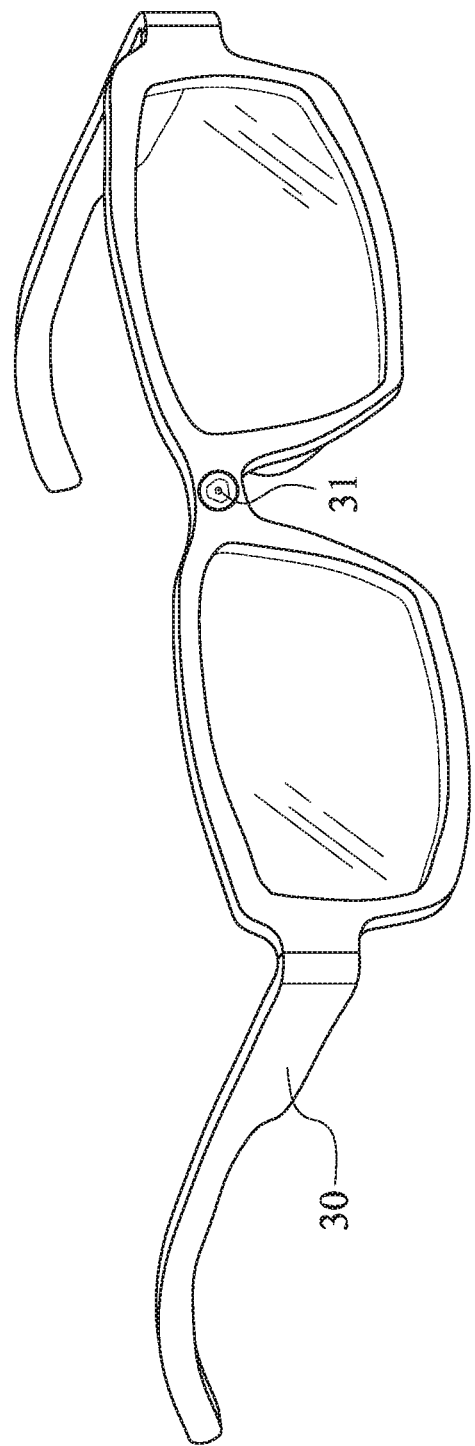
FIG. 7 shows an electronic device according to the 7th embodiment of the present disclosure.

FIG. 7 shows an electronic device 30 according to the 7th embodiment of the present disclosure. The electronic device 30 of the 7th embodiment is a wearable device. The electronic device 30 includes a camera module 31 and an image sensor (not shown in drawings), wherein the camera module 31 includes an imaging lens assembly (not shown in drawings) according to the present disclosure, and the image sensor is disposed on an image surface of the camera module 31.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly, comprising a plastic barrel, a lens set and a metal retainer, wherein the metal retainer is for fixedly disposing the lens set in the plastic barrel and comprises:
    an inner annular portion forming a through hole;
    a plurality of fixing portions directly contacting the plastic barrel for the metal retainer to be fixedly disposed in the plastic barrel; and
    a plurality of elastic portions, wherein at least one of the elastic portions connects the inner annular portion and at least one of the fixing portions;
    wherein a thickness of the metal retainer is d, and the following condition is satisfied:

$0.01\ mm < d < 0.20\ mm.$

2. The imaging lens assembly of claim 1, further comprising an adhesive layer, which is applied on the metal retainer and the plastic barrel.

3. The imaging lens assembly of claim 1, wherein the elastic portions surround the inner annular portion.

4. The imaging lens assembly of claim 3, wherein the lens set has an optical axis passing through the through hole of the metal retainer, an appearance of each of the elastic portions is in an arc shape, and the elastic portions are not overlapped along a radiation direction of the optical axis.

5. The imaging lens assembly of claim 1, wherein the fixing portions surround the inner annular portion, a length ratio between the fixing portions and a circular circumference corresponding to a maximum outer diameter of the metal retainer minus the fixing portions is f %, and the following condition is satisfied:

$5\% < f\ \% < 40\%.$

6. The imaging lens assembly of claim 5, wherein the length ratio between the fixing portions and the circular circumference corresponding to the maximum outer diameter of the metal retainer minus the fixing portions is f %, and the following condition is satisfied:

$10\% < f\ \% < 32\%.$

7. The imaging lens assembly of claim 2, wherein the lens set has an optical axis and comprises a plurality of lens elements, an image-side lens element is one of the lens elements closest to an image side of the lens set, an outer diameter surface of the image-side lens element comprises a first outer diameter surface and a second outer diameter surface in order from an object side to the image side of the lens set, only the first outer diameter surface of the first outer diameter surface and the second outer diameter surface contacts the plastic barrel, and a step difference is formed by the first outer diameter surface and the second outer diameter surface.

8. The imaging lens assembly of claim 7, wherein a maximum outer diameter of the first outer diameter surface is $\psi 1$, a maximum outer diameter of the second outer diameter surface is $\psi 2$, the step difference formed by the first outer diameter surface and the second outer diameter surface is $\Delta\psi$, which is calculated from $(\psi 2 - \psi 1)/2$, and the following condition is satisfied:

$0.05\ mm < \Delta\psi < 0.35\ mm.$

9. The imaging lens assembly of claim 7, wherein a plurality of gaps are disposed between the inner annular portion and the fixing portions.

10. The imaging lens assembly of claim 9, wherein the adhesive layer is filled in at least one of the gaps, and the image-side lens element, the metal retainer and the plastic barrel are fixedly adhered by the adhesive layer.

11. The imaging lens assembly of claim 7, wherein the adhesive layer is an opaque adhesive layer.

12. The imaging lens assembly of claim 7, wherein the image-side lens element comprises a plurality of strip-shaped wedge structures, and at least one of the strip-shaped wedge structures directly contacts the adhesive layer.

13. The imaging lens assembly of claim 12, wherein the strip-shaped wedge structures are disposed between the first outer diameter surface and the second outer diameter surface.

14. The imaging lens assembly of claim 12, wherein a number of the strip-shaped wedge structures is n, and the following condition is satisfied:

$100<n<600.$

15. The imaging lens assembly of claim 2, wherein an appearance of the metal retainer is black.

16. The imaging lens assembly of claim 15, wherein the thickness of the metal retainer is d, and the following condition is satisfied:

$0.01 \text{ mm}<d<0.13 \text{ mm}.$

17. The imaging lens assembly of claim 1, wherein a number of the fixing portions is smaller than or equal to a number of the elastic portions.

18. The imaging lens assembly of claim 1, wherein a number of the fixing portions is Nf, and the following condition is satisfied:

$6<Nf<16.$

19. A camera module, comprising:
the imaging lens assembly of claim 1.

20. An electronic device, comprising:
the camera module of claim 19; and
an image sensor disposed on an image surface of the camera module.

* * * * *